(12) United States Patent
Ohashi et al.

(10) Patent No.: US 11,114,969 B2
(45) Date of Patent: Sep. 7, 2021

(54) POWER CONVERTER, MOTOR DRIVING UNIT, AND ELECTRIC POWER STEERING DEVICE

(71) Applicant: Nidec Corporation, Kyoto (JP)

(72) Inventors: Hiromitsu Ohashi, Kyoto (JP); Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/487,862

(22) PCT Filed: Mar. 5, 2018

(86) PCT No.: PCT/JP2018/008277
§ 371 (c)(1),
(2) Date: Aug. 22, 2019

(87) PCT Pub. No.: WO2018/180237
PCT Pub. Date: Oct. 4, 2018

(65) Prior Publication Data
US 2020/0244206 A1 Jul. 30, 2020

(30) Foreign Application Priority Data
Mar. 29, 2017 (JP) .............................. JP2017-064081

(51) Int. Cl.
*H02P 27/08* (2006.01)
*H02P 29/024* (2016.01)
(Continued)

(52) U.S. Cl.
CPC ............ *H02P 27/08* (2013.01); *B62D 5/0463* (2013.01); *B62D 5/0481* (2013.01); *B62D 6/10* (2013.01);
(Continued)

(58) Field of Classification Search
CPC ...... H02P 27/08; H02P 29/0241; H02P 25/18; H02M 1/32; H02M 2001/009; H02M 2001/325
See application file for complete search history.

(56) References Cited

U.S. PATENT DOCUMENTS 5,146,147 A * 9/1992 Wills ........................ H02P 1/44
318/797
5,541,487 A * 7/1996 Yorozu ..................... H02P 8/14
318/400.13
(Continued)

FOREIGN PATENT DOCUMENTS

JP 2014-192950 A 10/2014
JP 2016-123223 A 7/2016

OTHER PUBLICATIONS

Official Communication issued in International Patent Application No. PCT/JP2018/008277, dated Jun. 5, 2018.

*Primary Examiner* — Rina I Duda
(74) *Attorney, Agent, or Firm* — Keating & Bennett, LLP

(57) ABSTRACT

A power converter includes a first inverter, a second inverter, and a switching circuit including first and second switching elements. In a state in which, in the first inverter, potentials at a first node in a high side and a second node in a low side are equal to each other, and potentials at first ends of two-phase windings of n-phase windings with n being an integer of 2 or more are equal to each other, two-phase windings are energized using two legs connected to second ends of the two-phase windings of n legs of the second inverter while performing switching operations on the first and second switching elements of the switching circuit at a predetermined duty ratio.

11 Claims, 17 Drawing Sheets

(51) Int. Cl.
  *B62D 5/04*   (2006.01)
  *B62D 6/10*   (2006.01)
  *H02H 7/08*   (2006.01)
  *H02M 1/32*   (2007.01)
  *H02M 7/5387*   (2007.01)
  *H02P 25/18*   (2006.01)
  *H02M 1/00*   (2006.01)

(52) U.S. Cl.
  CPC ............ *H02H 7/0838* (2013.01); *H02M 1/32* (2013.01); *H02M 7/53871* (2013.01); *H02P 25/18* (2013.01); *H02P 29/0241* (2016.02); *H02M 2001/0009* (2013.01); *H02M 2001/325* (2013.01)

(56) References Cited

U.S. PATENT DOCUMENTS

| | | | |
|---|---|---|---|
| 7,154,237 B2 | 12/2006 | Welchko et al. | |
| 7,294,984 B2 * | 11/2007 | Urakabe | H02P 25/20 318/378 |
| 8,002,056 B2 * | 8/2011 | Chakrabarti | B60L 15/02 180/65.22 |
| 8,743,573 B2 * | 6/2014 | Balpe | H02P 29/032 363/56.02 |
| 8,928,264 B2 * | 1/2015 | Taniguchi | H02P 25/188 318/400.26 |
| 2006/0164028 A1 | 7/2006 | Welchko et al. | |
| 2013/0094266 A1 | 4/2013 | Balpe | |
| 2015/0107934 A1 * | 4/2015 | Morino | B62D 5/0481 180/407 |
| 2016/0036371 A1 * | 2/2016 | Yamasaki | B62D 5/046 318/400.22 |
| 2018/0375457 A1 | 12/2018 | Kitamura et al. | |
| 2019/0097522 A1 | 3/2019 | Wada | |

\* cited by examiner

US 11,114,969 B2

POWER CONVERTER, MOTOR DRIVING UNIT, AND ELECTRIC POWER STEERING DEVICE

CROSS REFERENCE TO RELATED APPLICATIONS

This is the U.S. national stage of application No. PCT/JP2018/008277, filed on Mar. 5, 2018, and priority under 35 U.S.C. § 119(a) and 35 U.S.C. § 365(b) is claimed from Japanese Application No. 2017-064081, filed Mar. 29, 2017; the entire contents of which are incorporated herein by reference.

1. FIELD OF THE INVENTION

The present disclosure relates to a power converter that converts power supplied to an electric motor, a motor driving unit, and an electric power steering device.

2. BACKGROUND

Recently, an electromechanical integrated motor has been developed in which an electric motor (hereinafter simply expressed as a "motor"), a power converter, and an electronic control unit (ECU) are integrated. Meanwhile, in a vehicle field, high-quality assurance is required from the viewpoint of safety. Thus, a redundant design capable of continuing safe operation even when a portion of a component fails is adopted. As an example of the redundant design, providing two power converters for one motor has been considered. As another example, providing a backup microcontroller in a main microcontroller has been considered.

Conventionally, a related art discloses a power converter including a controller and two inverters and converts power from a power supply into power supplied to a three-phase motor. Each of the two inverters is connected to the power supply and a ground (hereinafter expressed as "GND"). One inverter is connected to one ends of three-phase windings of a motor, and the other inverter is connected to the other ends of the three-phase windings. Each inverter includes a bridge circuit composed of three legs, each of which includes a high-side switching element and a low-side switching element. When the controller detects failures of the switching elements of the two inverters, the controller switches a motor control from control in a normal state to control in an abnormal state. In the normal control, for example, the switching elements of the two inverters perform switching operations to drive the motor. In the control in an abnormal state, for example, a non-failed inverter uses a neutral point of a winding of a failed inverter to drive the motor.

SUMMARY

In the above-described related art, there is a need for further improvement in control in an abnormal state when a winding has failed. When the failure occurs in the winding, it is considered to use a neutral point of the winding of the failed inverter to energize through non-failed two-phase windings. In that case, a neutral point is floated so that it is difficult to drive the motor.

A power converter according to an example embodiment of the present disclosure converts power from a power supply into power supplied to a motor having n-phase windings with n being an integer of 2 or more and includes a first inverter connected to a first end of each phase winding of the motor and including n legs each including a low-side switching element and a high-side switching element, a second inverter connected to a second end of each phase winding and including n legs each including a low-side switching element and a high-side switching element, and a switching circuit including a first switching element to switch connection and disconnection between the first inverter and a ground and a second switching element to switch connection and disconnection between the first inverter and the power supply, wherein in a state in which, in the first inverter, potentials at a first node in a high side, to which the n legs are connected, and a second node in a low side, to which the n legs are connected, are equal to each other, and potentials at first ends of two-phase windings of the n-phase windings are equal to each other, the two-phase windings are energized using two legs connected to second ends of the two-phase windings of the n legs of the second inverter while performing switching operations on the first and second switching elements of the switching circuit at a predetermined duty ratio.

The above and other elements, features, steps, characteristics and advantages of the present disclosure will become more apparent from the following detailed description of the example embodiments with reference to the attached drawings.

DETAILED DESCRIPTION

Hereinafter, example embodiments of a power converter, a motor driving unit, and an electric power steering device of the present disclosure will be described in detail with reference to the accompanying drawings. However, in order to avoid unnecessary redundancy in the following description and to facilitate the understanding of those skilled in the art, an unnecessary detailed description may be omitted. For example, the detailed description of already well-known items and a redundant description of substantially the same configuration may be omitted.

In the present specification, example embodiments of the present disclosure will be described with an example of a power converter that converts power from a power supply into power supplied to a three-phase motor having three-phase (U-phase, V-phase, and W-phase) windings. However, a power converter that converts power from a power supply to power the supplied to an n-phase motor having n-phase (n is an integer of 4 or more) such as four-phase or five phase windings is also within the scope of the present disclosure.

Figure 1:
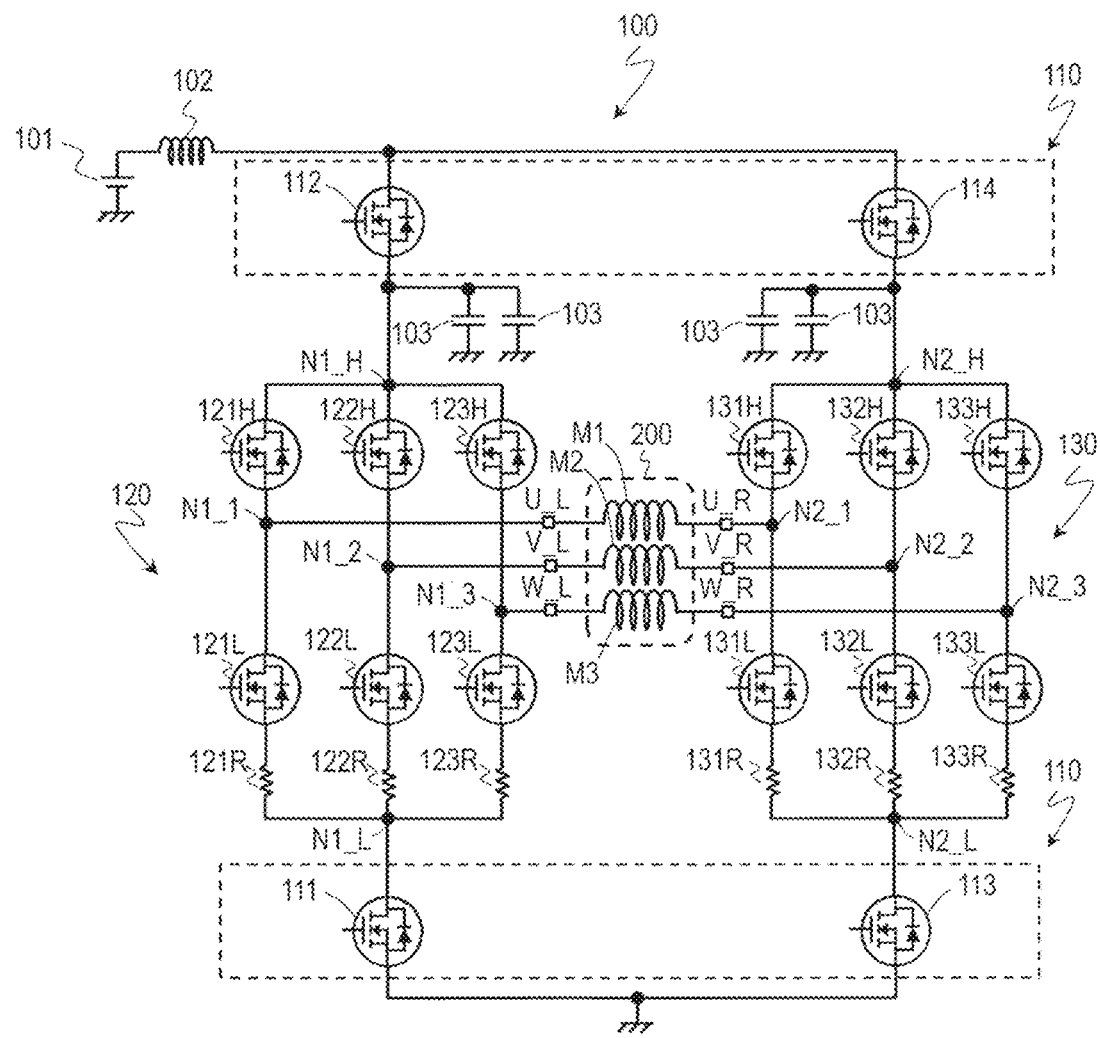
FIG. 1 is a circuit diagram schematically illustrating one circuit configuration of a power converter 100 according to a first example embodiment of the present disclosure.

FIG. 1 schematically illustrates a circuit configuration of a power converter 100 according to the present example embodiment.

The power converter 100 includes a switching circuit 110, a first inverter 120, and a second inverter 130. The power converter 100 may convert power from a power supply 101 into power supplied to a motor 200. For example, the first and second inverters 120 and 130 may convert direct current (DC) power into three-phase alternating current (AC) power which has pseudo-sine waves of a U-phase, a V-phase, and a W-phase.

The motor 200 is, for example, a three-phase AC motor. The motor 200 is provided with a U-phase winding M1, a V-phase winding M2, and a W-phase winding M3 and connected to the first inverter 120 and the second inverter 130. Specifically, the first inverter 120 is connected to one end of each phase winding of the motor 200, and the second inverter 130 is connected to the other end of each phase winding. In the present specification, "connection" between parts (components) mainly refers to an electrical connection.

The first inverter 120 includes terminals U_L, V_L, and W_L each corresponding to each phase. The second inverter 130 includes terminals U_R, V_R, and W_R each corresponding to each phase. In the first inverter 120, the terminal U_L is connected to one end of the U-phase winding M1, the terminal V_L is connected to one end of the V-phase winding M2, and the terminal W_L is connected to one end of the W-phase winding M3. Like in the first inverter 120, in the second inverter 130, the terminal U_R is connected to the other end of the U-phase winding M1, the terminal V_R is connected to the other end of the V-phase winding M2, and the terminal W_R is connected to the other end of the W-phase winding M3. Such a motor connection is different from so-called star connections and delta connections.

The switching circuit 110 includes first to fourth switching elements 111, 112, 113, and 114. In the power converter 100, each of the first and second inverters 120 and 130 may be electrically connected to the power supply 101 and ground (GND) by the switching circuit 110. Specifically, the first switching element 111 switches connection and disconnection between the first inverter 120 and the GND. The second switching element 112 switches connection and disconnection between the power supply 101 and the first inverter 120. The third switching element 113 switches connection and disconnection between the second inverter 130 and the GND. The fourth switching element 114 switches connection and disconnection between the power supply 101 and the second inverter 130.

Turning on or off of the first to fourth switching elements 111, 112, 113, and 114 may be controlled by, for example, a microcontroller or a dedicated driver. The first to fourth switching elements 111, 112, 113, and 114 may cut off a bidirectional current. The first to fourth switching elements 111, 112, 113, and 114 may include, for example, semiconductor switches such as thyristors, analog switch integrated circuits (ICs), or field effect transistors (FETs) (typically, metal oxide semiconductor field effect transistors (MOSFETs)) having parasitic diodes formed therein, mechanical relays, and the like. A combination of diodes and insulated gate bipolar transistors (IGBTs) may be used. In the drawings of the present specification, an example in which MOSFETs are used as the first to fourth switching elements 111, 112, 113, and 114 is illustrated. Hereinafter, the first to fourth switching elements 111, 112, 113, and 114 may be expressed as SWs 111, 112, 113, and 114, respectively.

The SW 111 is disposed such that a forward current flows in an internal parasitic diode toward the first inverter 120.

The SW 112 is disposed such that a forward current flows in an internal parasitic diode toward the power supply 101. The SW 113 is disposed such that a forward current flows in an internal parasitic diode toward the second inverter 130. The SW 114 is disposed such that a forward current flows in an internal parasitic diode toward the power supply 101.

The number of switching elements to be used is not limited to the illustrated example and is appropriately determined in consideration of design specifications and the like. Particularly, since high-quality assurance is required in an automobile field from the viewpoint of safety, a plurality of switching elements may be provided for each inverter.

Figure 2:
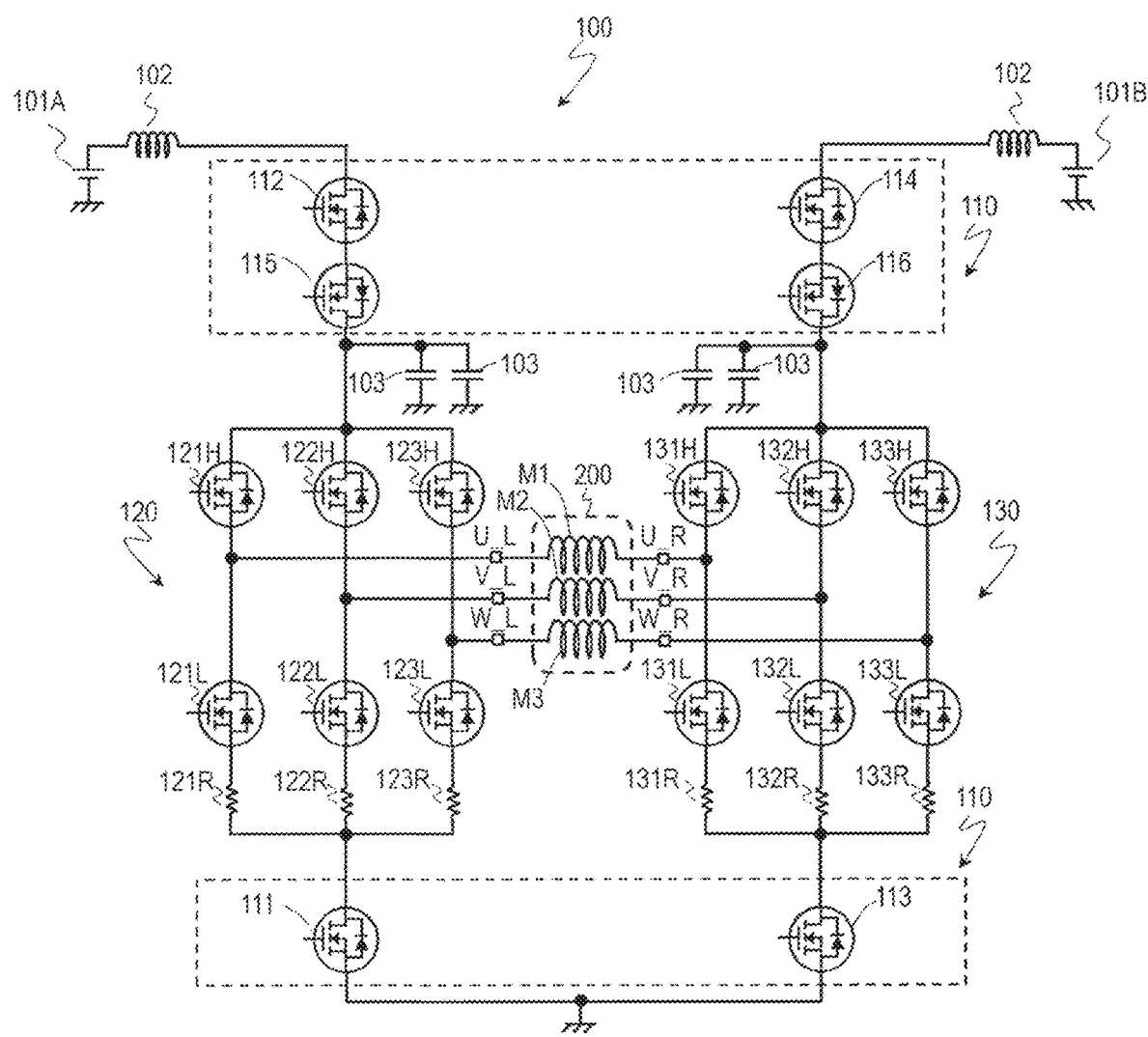
FIG. 2 is a circuit diagram schematically illustrating another circuit configuration of the power converter 100 according to the first example embodiment of the present disclosure.

FIG. 2 schematically illustrates another circuit configuration of the power converter 100 according to the present example embodiment.

The switching circuit 110 may further include fifth and sixth switching elements 115 and 116 for reverse connection protection. The fifth and sixth switching elements 115 and 116 are semiconductor switches such as a typical MOSFET having a parasitic diode. The fifth switching element 115 is connected to the SW 112 in series and disposed such that a forward current flows in the parasitic diode toward the first inverter 120. The sixth switching element 116 is connected to the SW 114 in series and disposed such that a forward current flows in the parasitic diode toward the second inverter 130. Thus, even when the power supply 101 is connected in a reverse direction, a reverse current may be cut off by the two switching elements for reverse connection protection.

FIG. 1 is referred to again.

The power supply 101 generates a predetermined power supply voltage (for example, 12 V). For example, a DC power supply is used as the power supply 101. However, the power supply 101 may be an AC-to-DC converter and a DC-to-DC converter, or may be a battery (storage battery).

The power supply 101 may be a single power supply common to the first and second inverters 120 and 130 or may include a first power supply 101A for the first inverter 120 and a second power supply 101B for the second inverter 130 as shown in FIG. 2.

A coil 102 is installed between the power supply 101 and the switching circuit 110. The coil 102 functions as a noise filter and smooths high-frequency noise included in a voltage waveform supplied to each inverter or high-frequency noise generated in each inverter so as not to flow out toward the power supply 101. Further, a capacitor 103 is connected to a power supply terminal of each inverter. The capacitor 103 is a so-called bypass capacitor and suppresses voltage ripples. The capacitor 103 is, for example, an electrolytic capacitor, and the capacity and the number to be used are appropriately determined according to design specifications and the like.

The first inverter 120 (sometimes expressed as a "bridge circuit L") includes a bridge circuit having three legs. Each leg includes a low-side switching element and a high-side switching element. A U-phase leg includes a low-side switching element 121L and a high-side switching element 121H. A V-phase leg includes a low-side switching element 122L and a high-side switching element 122H. A W-phase leg includes a low-side switching element 123L and a high-side switching element 123H. As the switching element, for example, FETs or IGBTs may be used. Hereinafter, an example in which a MOSFET is used as the switching element is described, and the switching element may be expressed as an SW. For example, the switching elements 121L, 122L, and 123L are expressed as SWs 121L, 122L, and 123L.

The first inverter 120 includes three shunt resistors 121R, 122R, and 123R as current sensors (see FIG. 3) for detecting currents flowing through phase windings of the U-phase, the V-phase, and the W-phase, respectively. A current sensor 150 includes a current detection circuit (not shown) that detects a current flowing through each shunt resistor. For example, the shunt resistors 121R, 122R, and 123R are connected between the three low-side switching elements, which are included in the three legs of the first inverter 120, and the GND, respectively. Specifically, the shunt resistor 121R is electrically connected between the SW 121L and the SW 111, the shunt resistor 122R is electrically connected between the SW 122L and the SW 111, and the shunt resistor 123R is electrically connected between the SW 123L and the SW 111. A resistance value of the shunt resistors is, for example, in the range of about 0.5 mΩ to about 1.0 mΩ.

The second inverter 130 (sometimes expressed as a "bridge circuit R") includes a bridge circuit having three legs like the first inverter 120. A U-phase leg includes a low-side switching element 131L and a high-side switching element 131H. A V-phase leg includes a low-side switching element 132L and a high-side switching element 132H. A W-phase leg includes a low-side switching element 133L and a high-side switching element 133H. Further, the second inverter 130 includes three shunt resistors 131R, 132R, and 133R. The shunt resistors are connected between the three low-side switching elements, which are included in the three legs, and the GND, respectively. Each SW of the first and second inverters 120 and 130 may be controlled by, for example, a microcontroller or a dedicated driver.

For each inverter, the number of shunt resistors is not limited to three. For example, it is possible to use two shunt resistors for the U-phase and the V-phase, two shunt resistors for the V-phase and the W-phase, and two shunt resistors for the U-phase and the W-phase. The number of shunt resistors to be used and the arrangement of the shunt resistors are appropriately determined in consideration of product costs, design specifications, and the like.

As described above, the second inverter 130 has substantially the same structure as the structure of the first inverter 120. In the present specification, the first and second inverters 120 and 130 may be used interchangeably without distinction as components of the power converter 100.

Figure 3:
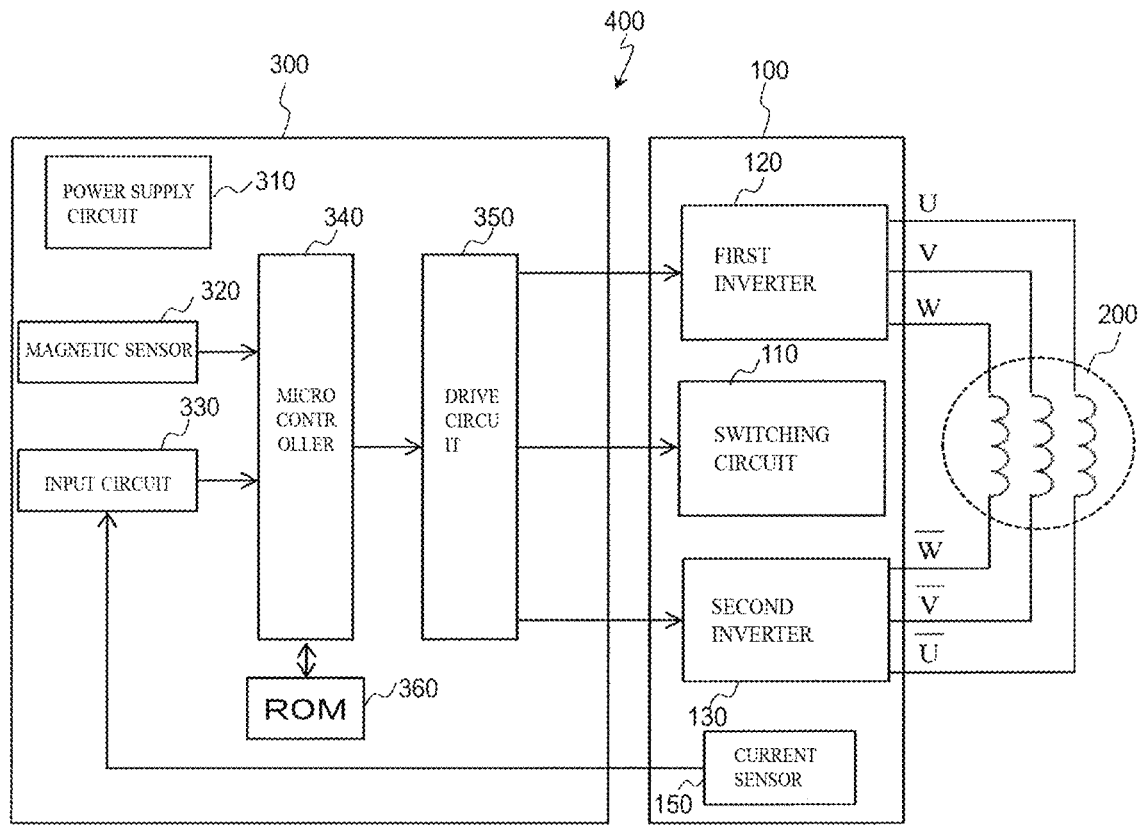
FIG. 3 is a block diagram schematically illustrating a typical block configuration of a motor driving unit 400 including the power converter 100.

FIG. 3 schematically illustrates a typical block configuration of a motor driving unit 400 including the power converter 100.

The motor driving unit 400 includes the power converter 100, the motor 200, and a control circuit 300.

The motor driving unit 400 is modularized and may be manufactured and sold as a motor module including, for example, a motor, a sensor, a driver, and a controller. In the present specification, the motor driving unit 400 will be described as an example of a system including the motor 200 as a component. However, the motor driving unit 400 may be a system for driving the motor 200 without including the motor 200 as a component.

The control circuit 300 includes, for example, a power supply circuit 310, an angle sensor 320, an input circuit 330, a microcontroller 340, a driving circuit 350, and a read-only memory (ROM) 360. The control circuit 300 is connected to the power converter 100 and drives the motor 200 by controlling the power converter 100.

Specifically, the control circuit 300 may implement closed-loop control by controlling a target position, rotation speed, and a current, or the like of a rotor. Further, control circuit 300 may include a torque sensor instead of the angle sensor 320. In this case, the control circuit 300 may control target motor torque.

The power supply circuit 310 generates DC voltages (for example, 3 V or 5 V) necessary for each block in the circuit. For example, the angle sensor 320 is a resolver or a Hall IC. Alternatively, the angle sensor 320 is implemented through a combination of a magnetoresistance (MR) sensor having an MR element and a sensor magnet. The angle sensor 320 detects a rotation angle (hereinafter, expressed as a "rotation signal") of the rotor of the motor 200 and outputs the rotation signal to the microcontroller 340.

The input circuit 330 receives a motor current value (hereinafter expressed as an "actual current value") detected by the current sensor 150, converts a level of the actual current value into an input level of the microcontroller 340 as necessary, and outputs the actual current value to the microcontroller 340. The input circuit 330 is, for example, an analog-to-digital conversion circuit.

The microcontroller 340 controls a switching operation (turning on or off) of each SW of the first and second inverters 120 and 130 of the power converter 100. The microcontroller 340 sets a target current value according to the actual current value, the rotation signal of the rotor, and the like to generate a pulse width modulation (PWM) signal and outputs the generated PWM signal to the driving circuit 350. Further, the microcontroller 340 may control on or off of each SW of the switching circuit 110 of the power converter 100.

The driving circuit 350 is typically a gate driver. The driving circuit 350 generates a control signal (gate control signal) which controls a switching operation of the MOSFET of each SW of the first and second inverters 120 and 130 according to the PWM signal and outputs the control signal to a gate of each SW. Further, the driving circuit 350 may generate a control signal that controls on or off of each SW of the switching circuit 110 according to an instruction from the microcontroller 340. Functions of the driving circuit 350 may be built in the microcontroller 340. In that case, for example, the microcontroller 340 may directly control on or off of the SWs of the switching circuit 110 and the switching operations of the SWs of each inverter through dedicated ports.

The ROM 360 is, for example, a writable memory (for example, a programmable ROM (PROM)), a rewritable memory (for example, a flash memory), or a ROM. The ROM 360 stores control programs including an instruction group allowing the microcontroller 340 to control the power converter 100. For example, the control programs are once loaded in a random access memory (RAM) (not shown) at booting.

The power converter 100 has control in normal and abnormal states. The control circuit 300 (mainly the microcontroller 340) may switch the control of the power converter 100 from the control in a normal state to the control in an abnormal state. An on or off state of each SW of the switching circuit 110 is determined according to the windings of the motor 200 and failure patterns of the SWs in each inverter. Further, an on or off state of each SW of the failed inverter is also determined.

First, a specific example of a control method of the normal control of the power converter 100 will be described. The term "normal" indicates a state in which each SW of the first and second inverters 120 and 130 hasn't failed, and none of the three-phase windings M1, M2, and M3 of the motor 200 have failed.

In the normal state, the control circuit 300 turns on all of the SWs 111, 112, 113, and 114 of the switching circuit 110. Thus, the power supply 101 is electrically connected to the first inverter 120, and the power supply 101 is also electrically connected to the second inverter 130. Further, the first inverter 120 is electrically connected to the GND, and the second inverter 130 is also electrically connected to the GND. In such a connection state, the control circuit 300 energizes the three-phase windings M1, M2, and M3 using both of the first and second inverters 120 and 130 to drive the motor 200. In the present specification, energizing the three-phase windings may be referred to as a "three-phase energization control" and energizing two-phase windings may be referred to as a "two-phase energization control".

Figure 4:
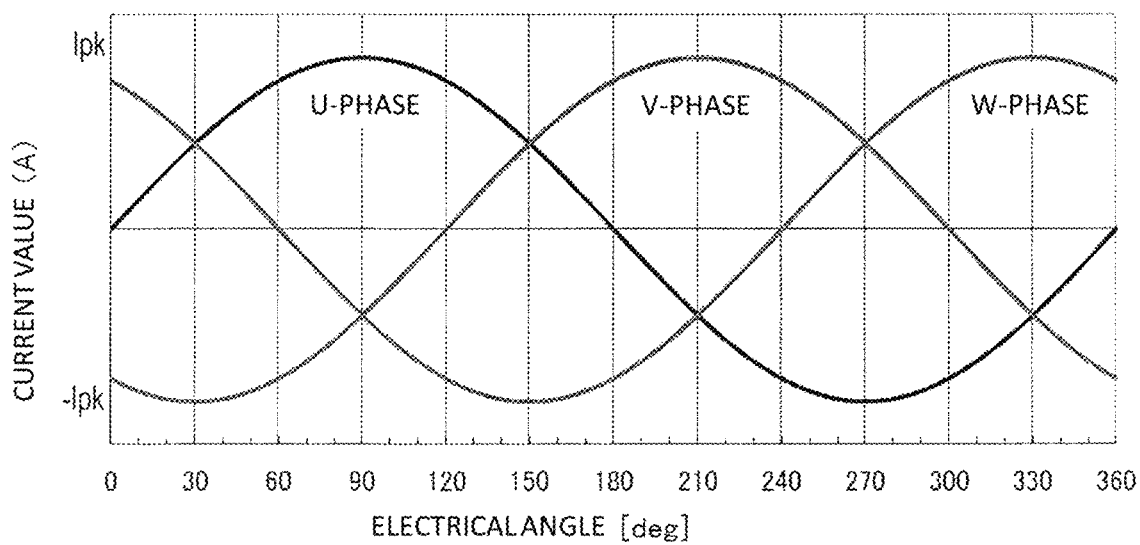
FIG. 4 is a graph illustrating an example of current waveforms (sine waves) obtained by plotting a value of a current flowing through each of U-phase, V-phase, and W-phase windings of a motor 200 when the power converter 100 is controlled according to a three-phase energization control.

FIG. 4 illustrates an example of current waveforms (sine wave) obtained by plotting a value of the current flowing through each of the U-phase, V-phase, and W-phase windings of the motor 200 when the power converter 100 is controlled according to the three-phase energization control. A horizontal axis indicates electrical angles (deg) of the motor, and a vertical axis indicates the values (A) of the current. In the current waveforms of FIG. 4, the value of the current is plotted for every electrical angle of 30°. $I_{pk}$ represents the maximum value of the current (the value of a peak current) of each phase.

Table 1 shows the values of the currents flowing through the terminals of each inverter for each electrical angle in the sine waves of FIG. 4. Specifically, Table 1 illustrates the values of the currents flowing through the terminals U_L, V_L, and W_L of the first inverter 120 (bridge circuit L) for every electrical angle of 30° and the values of the currents flowing through the terminals U_R, V_R, and W_R of the second inverter 130 (bridge circuit R) for every electrical angle of 30°. Here, a direction of the current flowing from the terminal of the bridge circuit L to the terminal of the bridge circuit R is defined as a positive direction for the bridge circuit L. The direction of the current shown in FIG. 4 follows this definition. Further, a direction of the current flowing from the terminal of the bridge circuit R to the terminal of the bridge circuit L is defined as a positive direction for the bridge circuit R. Accordingly, the phase difference between the current of the bridge circuit L and the current of the bridge circuit R is 180°. In Table 1, the magnitude of a value $I_1$ of the current is $[(3)^{1/2}/2] \times I_{pk}$, and the magnitude of a value $I_2$ of the current is $I_{pk}/2$.

TABLE 1

| Operation | | Electrical angle [deg] | | | | | | | | | | | |
|---|---|---|---|---|---|---|---|---|---|---|---|---|---|
| in normal state | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |

TABLE 1-continued

| Operation in normal state | Electrical angle [deg] | | | | | | | | | | | |
|---|---|---|---|---|---|---|---|---|---|---|---|---|
| | 0 (360) | 30 | 60 | 90 | 120 | 150 | 180 | 210 | 240 | 270 | 300 | 330 |
| Bridge circuit R U_R phase | 0 | -I$_2$ | -I$_1$ | -I$_{pk}$ | -I$_1$ | -I$_2$ | 0 | I$_2$ | I$_1$ | I$_{pk}$ | I$_1$ | I$_2$ |
| V_R phase | I$_1$ | I$_{pk}$ | I$_1$ | I$_2$ | 0 | -I$_2$ | -I$_1$ | -I$_{pk}$ | -I$_1$ | -I$_2$ | 0 | I$_2$ |
| W_R phase | -I$_1$ | -I$_2$ | 0 | I$_2$ | I$_1$ | I$_{pk}$ | I$_1$ | I$_2$ | 0 | -I$_2$ | -I$_1$ | -I$_{pk}$ |

At an electrical angle of 0°, no current flows through the U-phase winding M1. A current of magnitude I$_1$ flows from the bridge circuit R to the bridge circuit L through the V-phase winding M2, and the current of magnitude I$_1$ flows from the bridge circuit L to the bridge circuit R through the W-phase winding M3.

At an electrical angle of 30°, a current of magnitude 12 flows from the bridge circuit L to the bridge circuit R through the U-phase winding M1, a current of magnitude I$_{pk}$ flows from the bridge circuit R to the bridge circuit L through the V-phase winding M2, and the current of magnitude I$_2$ flows from the bridge circuit L to the bridge circuit R through the W-phase winding M3.

At an electrical angle of 60°, the current of magnitude I$_1$ flows from the bridge circuit L to the bridge circuit R through the U-phase winding M1, and the current of magnitude I$_1$ flows from the bridge circuit R to the bridge circuit L through the V-phase winding M2. No current flows through the W-phase winding M3.

At an electrical angle of 90°, the current of magnitude I$_{pk}$ flows from the bridge circuit L to the bridge circuit R through the U-phase winding M1, the current of magnitude I$_2$ flows from the bridge circuit R to the bridge circuit L through the V-phase winding M2, and the current of magnitude I$_2$ flows from the bridge circuit R to the bridge circuit L through the W-phase winding M3.

At an electrical angle of 120°, the current of magnitude I$_1$ flows from the bridge circuit L to the bridge circuit R through the U-phase winding M1, and the current of magnitude I$_1$ flows from the bridge circuit R to the bridge circuit L through the W-phase winding M3. No current flows through the V-phase winding M2.

At an electrical angle of 150°, the current of magnitude 12 flows from the bridge circuit L to the bridge circuit R through the U-phase winding M1, the current of magnitude I$_2$ flows from the bridge circuit L to the bridge circuit R through the V-phase winding M2, and the current of magnitude I$_{pk}$ flows from the bridge circuit R to the bridge circuit L through the W-phase winding M3.

At an electrical angle of 180°, no current flows through the U-phase winding M1. The current of magnitude I$_1$ flows from the bridge circuit L to the bridge circuit R through the V-phase winding M2, and the current of magnitude I$_1$ flows from the bridge circuit R to the bridge circuit L through the W-phase winding M3.

At an electrical angle of 210°, the current of magnitude I$_2$ flows from the bridge circuit R to the bridge circuit L through the U-phase winding M1, the current of magnitude I$_{pk}$ flows from the bridge circuit L to the bridge circuit R through the V-phase winding M2, and the current of magnitude I$_2$ flows from the bridge circuit R to the bridge circuit L through the W-phase winding M3.

At an electrical angle of 240°, the current of magnitude flows from the bridge circuit R to the bridge circuit L through the U-phase winding M1, and the current of magnitude I$_1$ flows from the bridge circuit L to the bridge circuit R through the V-phase winding M2. No current flows through the W-phase winding M3.

At an electrical angle of 270°, the current of magnitude I$_{pk}$ flows from the bridge circuit R to the bridge circuit L through the U-phase winding M1, the current of magnitude I$_2$ flows from the bridge circuit L to the bridge circuit R through the V-phase winding M2, and the current of magnitude I$_2$ flows from the bridge circuit L to the bridge circuit R through the W-phase winding M3.

At an electrical angle of 300°, the current of magnitude flows from the bridge circuit R to the bridge circuit L through the U-phase winding M1, and the current of magnitude I$_1$ flows from the bridge circuit L to the bridge circuit R through the W-phase winding M3. No current flows through the V-phase winding M2.

At an electrical angle of 330°, the current of magnitude 12 flows from the bridge circuit R to the bridge circuit L through the U-phase winding M1, the current of magnitude I$_2$ flows from the bridge circuit R to the bridge circuit L through the V-phase winding M2, and the current of magnitude I$_{pk}$ flows from the bridge circuit L to the bridge circuit R through the W-phase winding M3.

In the current waveform shown in FIG. 4, the sum of the currents flowing through the three-phase windings taking the direction of the current into consideration is "0" for each electrical angle. However, according to the circuit configuration of the power converter 100, since the currents flowing through the three-phase windings may be controlled independently, the sum of the currents may be controlled not to be "0". For example, the control circuit 300 controls the switching operation of each switching element of the first and second inverters 120 and 130 according to the PWM control in which the current waveforms shown in FIG. 4 are obtained.

The abnormal state mainly indicates (1) failures of the switching elements of each inverter, and (2) failures of the windings of the motor 200. (1) The failures of the switching elements of each inverter are roughly classified into an "open failure" and a "short failure". The "open failure" refers to a failure in which connection between a source and a drain of the FET is opened (in other words, a resistance rds between the source and the drain becomes high impedance), and the "short failure" refers to a failure in which the source and the drain of the FET are short-circuited. Further, (2) the failures of the windings of the motor 200 refer to, for example, disconnection of the winding.

FIG. 1 is referred to again.

It is considered that a random failure usually occurs in which one SW among 16 SWs randomly fails while the power converter 100 is in operation. The present disclosure is mainly directed to a method of controlling the power converter 100 in a case in which the random failure occurs.

However, the present disclosure also covers the method of controlling the power converter 100 in a case in which a plurality of SWs have failed in a cascading manner and the like. The cascading failure refers to, for example, a failure that occurs simultaneously in the high-side switching element and the low-side switching element of each leg.

When the power converter 100 is used for a long period of time, the random failure may occur. Also, the winding may be disconnected. Such a random failure and disconnection of the winding are different from the manufacturing failure which may occur during manufacturing. The three-phase energization control at the normal state is impossible when even one of the plurality of switching elements of the two inverters has failed. The three-phase energization control at the normal state is also impossible when any one of the three-phase windings M1, M2, and M3 is disconnected.

As one example of failure detection, the driving circuit 350 monitors a voltage Vds between the drain and the source of the switching element (MOSFET) and compares the Vds with a predetermined threshold voltage to detect the failure of the switching element. The threshold voltage is set in the driving circuit 350 through, for example, attached components and data communication with external ICs (not shown). The driving circuit 350 is connected to ports of the microcontroller 340 and notifies a failure detection signal to the microcontroller 340. For example, when the driving circuit 350 detects the failure of the switching element, the driving circuit 350 asserts the failure detection signal. When the microcontroller 340 receives the asserted failure detection signal, the microcontroller 340 reads internal data of the driving circuit 350 to determine which switching element has failed among the plurality of switching elements.

As another example of the failure detection, the microcontroller 340 may also detect a failure of the switching element on the basis of the difference between the actual current value of the motor 200 and the target current value. Further, the microcontroller 340 may also detect whether the winding of the motor 200 is disconnected on the basis of, for example, the difference between the actual current value of the motor 200 and the target current value. However, the failure detection is not limited thereto, and known methods related to the failure detection may De widely used.

When the failure detection signal is asserted, the microcontroller 340 switches the control of the power converter 100 from the control in the normal state to the control in the abnormal state. A time at which the control is switched from the normal state to the abnormal state is, for example, in a range of about 10 msec to 30 msec after the failure detection signal is asserted.

Hereinafter, an example of a method of controlling the motor when the first inverter 120 has failed will be described.

In the present specification, an example of the control in the abnormal state in a case in which failures occur in the switching elements of the first inverter 120 will be described. Of course, the method described below may also be applied to the control in the abnormal state in a case in which failures occur in the switching elements of the second inverter 130. Hereinafter, there are cases in which the failure of the switching element in each inverter is expressed as "the failure of the inverter".

Figure 5:
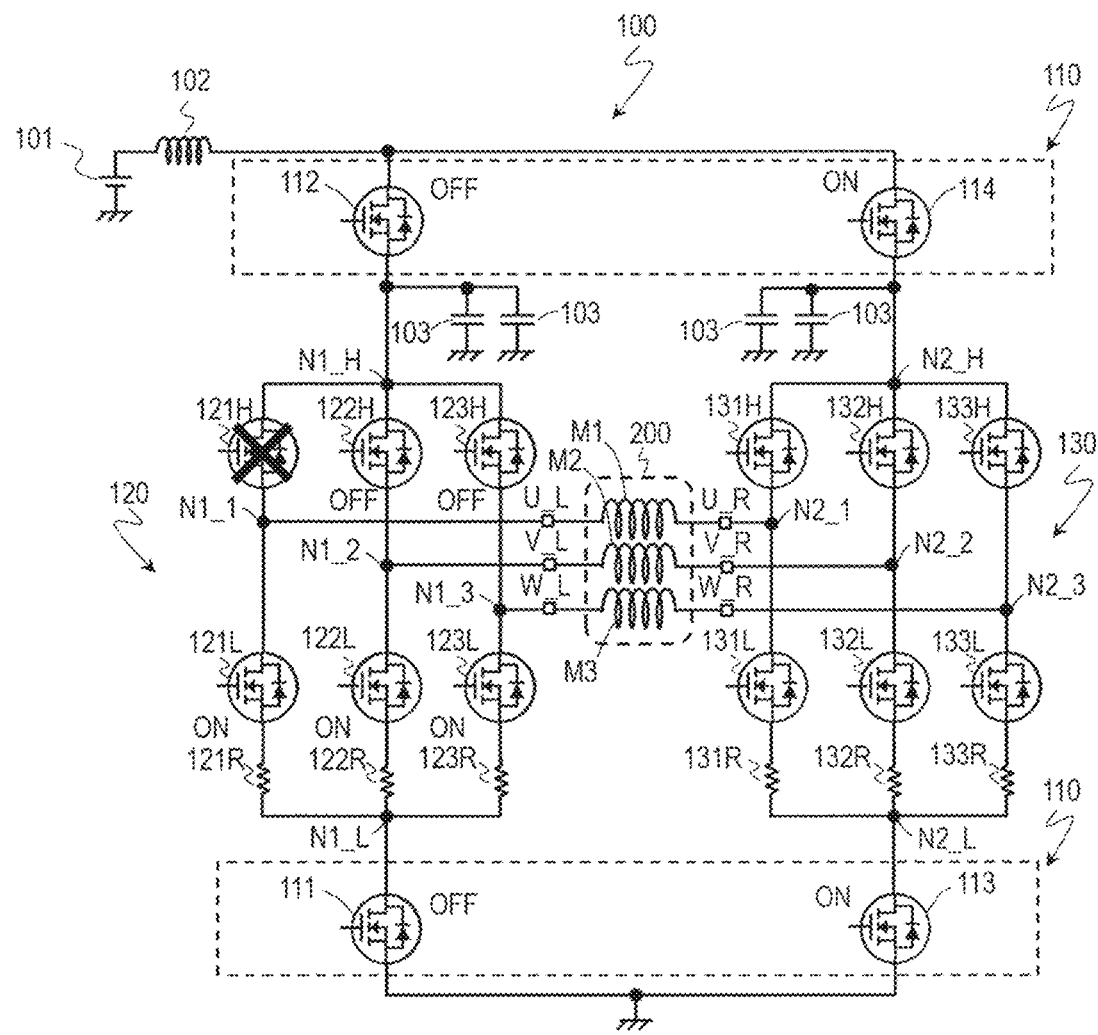
FIG. 5 is a diagram illustrating an example of an on or off state of each switching element of a first inverter 120 and a switching circuit 110 when a high-side switching element of the first inverter 120 has failed.

FIG. 5 illustrates an example of an on or off state of each switching element of the first inverter 120 and the switching circuit 110 when the high-side switching element of the first inverter 120 has failed.

For example, it is assumed that the SW 121H of the first inverter 120 has an open failure. In that case, the control circuit 300 turns off the high-side switching elements 122H and 123H other than the SW 121H and turns on the three low-side switching elements 121L, 122L, and 123L, in the first inverter 120. Thus, for example, as in the related art, the second node N1_L in the low-side, to which three legs are connected, may function as a neutral point. For example, the control circuit 300 turns on the SWs 113 and 114 and turns off the SWs 111 and 112 in the switching circuit 110. Thus, the first inverter 120 is electrically isolated from the power supply 101 and the GND.

For example, the control circuit 300 may energize the windings M1, M2, and M3 by controlling the switching operation of each switching element of the second inverter 130 by the PWM control, in which the current waveform shown in FIG. 3 is obtained, using the neutral point of the first inverter 120. For example, the motor may be continuously driven while maintaining the motor torque by performing the three-phase energization control in the same manner as in the normal control.

When the low-side switching element of the first inverter 120, for example, the SW 121L has an open failure (not shown), the control circuit 300 turns off, for example, the low-side switching elements 122L and 123L other than the SW 121L and turns on the three high-side switching elements 121H, 122H, and 123H in the first inverter 120. Thus, the first node N1_H in the high-side to which the three legs are connected may function as the neutral point. The control circuit 300 may energize the windings M1, M2, and M3 by controlling the switching operation of each switching element of the second inverter 130 by the PWM control, in which the current waveform shown in FIG. 3 is obtained, using the neutral point of the first inverter 120.

Hereinafter, an example of a method of controlling the motor in a case in which one of the windings M1, M2, and M3 of the motor 200 has failed will be described.

Figure 6A:
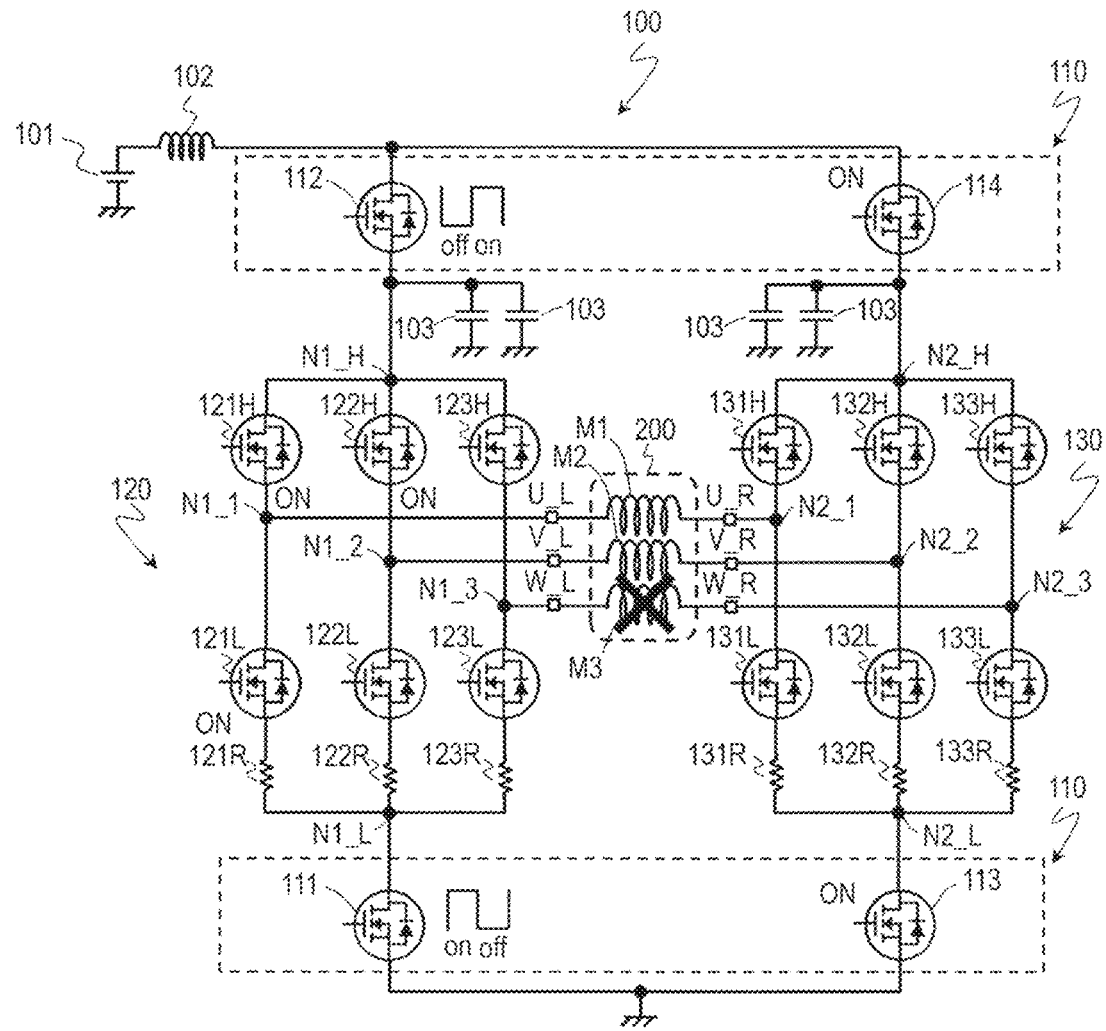
FIG. 6A is a diagram illustrating an example of the on or off state of each switching element of the first inverter 120 and the switching circuit 110 when a failure occurs in the winding of the motor 200.
Figure 6B:
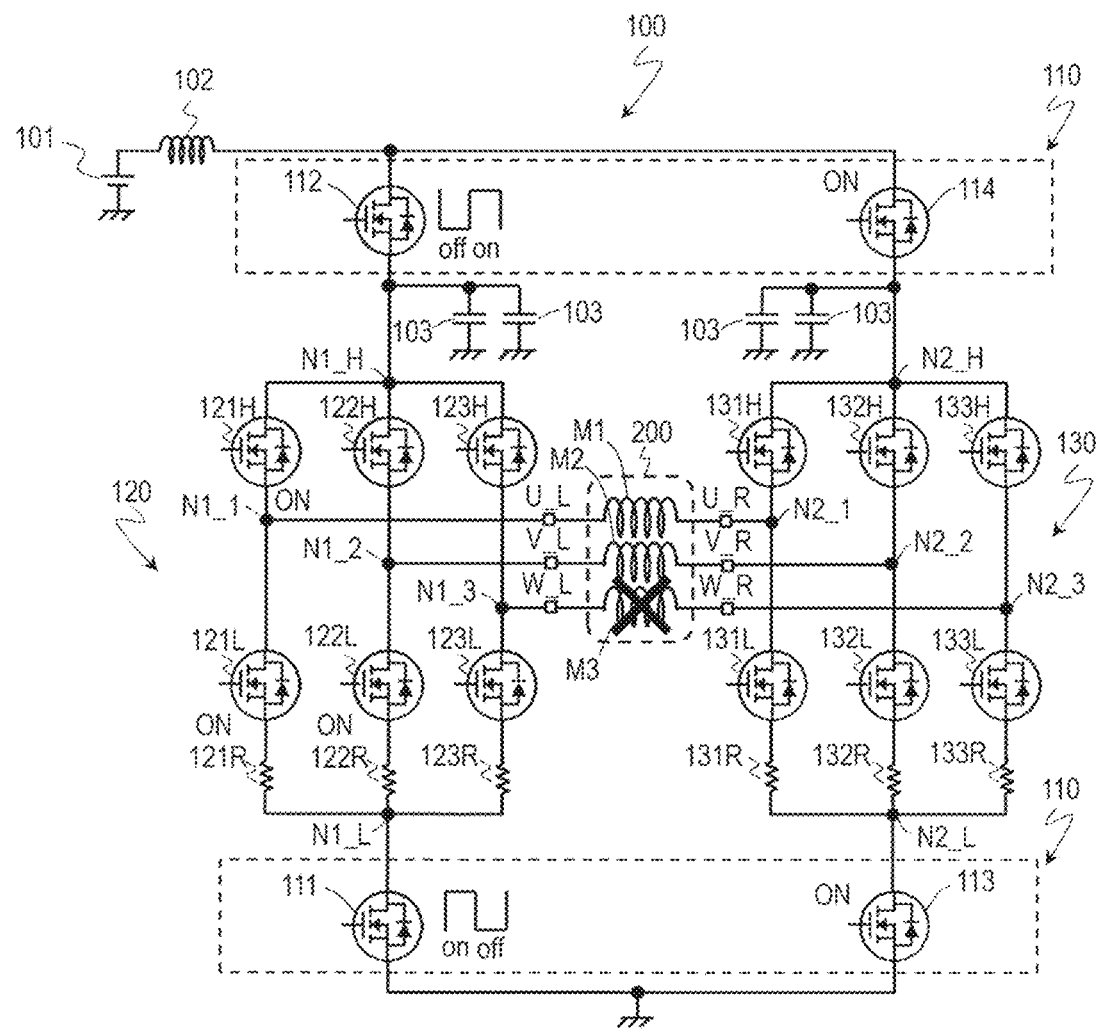
FIG. 6B is a diagram illustrating an example of the on or off state of each switching element of the first inverter 120 and the switching circuit 110 when a failure occurs in the winding of the motor 200.
Figure 6C:
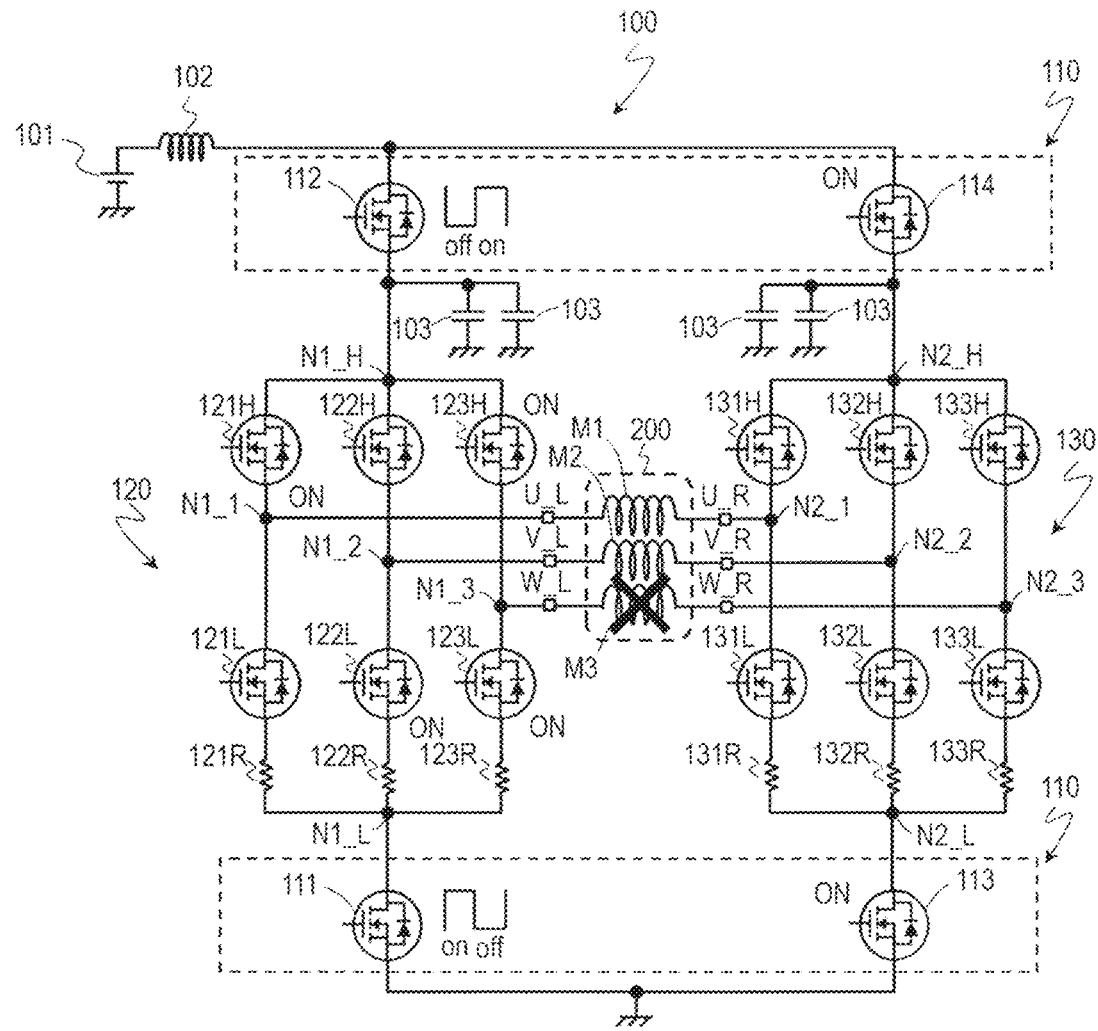
FIG. 6C is a diagram illustrating an example of the on or off state of each switching element of the first inverter 120 and the switching circuit 110 when a failure occurs in the winding of the motor 200.

FIGS. 6A to 6C illustrate an example of an on or off state of each switching element of the first inverter 120 and the switching circuit 110 when a failure occurs in the winding of the motor 200.

For example, it is assumed that the winding M3 of the motor 200 is disconnected. In that case, the control circuit 300 may switch the motor control from the three-phase energization control to the two-phase energization control. In the two-phase energization control, the on or off state of each switching element of the first inverter 120 is determined such that, in the first inverter 120, the first node N1_H in the high-side and the second node N1_L in the low-side have the same potential, and the one ends of the two-phase windings M1 and M2 of the windings M1, M2, and M3 have the same potential.

In the first inverter 120, both of the low-side switching element and the high-side switching element included in at least one of the three legs are turned on. For example, as shown in FIG. 6A, the first node N1_H and the second node N1_L may have the same potential by turning on the SWs 121H and 121L of the U-phase leg.

Further, the control circuit 300 turns on the high-side switching element included in one of the two legs connected to the one ends of the non-failed two-phase windings M1 and M2 and turns on at least one of the high-side switching element and the low-side switching element included in the other one of the two legs. For example, as shown in FIG. 6A, the control circuit 300 turns on the SW 122H of the V-phase leg of the two legs connected to the one ends of the two-phase windings M1 and M2 and turns on the SWs 121H and 121L of the U-phase leg. Thus, the one ends of the windings M1 and M2 may have the same potential, that is, a node N1_1 connecting the U-phase leg to the one end of the winding M1 may have the same potential as a node N1_2 connecting the V-phase leg to the one end of the winding M2. The on or off states of the SWs 122L, 123H, and 123L are irrelevant.

The control circuit 300 may turn on the low-side switching element included in one of the two legs connected to the one ends of the non-failed two-phase windings M1 and M2 and turn on at least one of the high-side switching element and the low-side switching element included in the other one of the two legs. For example, as shown in FIG. 6B, the control circuit 300 may turn on the SW 122L of the V-phase leg of the two legs connected to the one ends of the two-phase windings M1 and M2 and turn on the SWs 121H and 121L of the U-phase leg. The on or off states of the SWs 122H, 123H, and 123L are irrelevant.

As another example, as shown in FIG. 6C, the control circuit 300 may turn on the SWs 123H and 123L of the W-phase leg, the SW 121H of the U-phase leg, and the SW 122L of the V-phase leg. Alternatively, the control circuit 300 may turn on the SW 121L of the U-phase leg and the SW 122H of the V-phase leg. Thus, the first node N1_H and the second node N1_L in the first inverter 120 may have the same potential, and the nodes N1_1 and N1_2 may have the same potential.

In the examples described above, all of the nodes N1_H, N1_L, N1_1, and N1_2 of the first inverter 120 have the same potential. In this state, the control circuit 300 further performs the switching operation on both the first and second switching elements 111 and 112 of the switching circuit 110.

The control circuit 300 may energize the two-phase windings M1 and M2 using two legs, which are connected to the other ends of the two-phase windings M1 and M2, of the three legs of the second inverter 130 while performing the switching operation on the first and second switching elements 111 and 112 at a predetermined duty ratio. For example, the control circuit 300 performs the switching operation on the SW 111 and the SW 112 at a predetermined duty ratio. The duty ratio is, for example, 50%.

The SW 111 and the SW 112 are switched such that the on or off states of the SW 111 and the SW 112 are opposite to each other. When the SW 111 is turned on, the SW 112 is turned off. When the SW 111 is turned off, the SW 112 is turned on. The SW 111 and the SW 112 are not turned on simultaneously. The SW 111 and the SW 112 have the same switching period as the switching element included in each leg of the second inverter 130. Since the nodes in the first inverter 120 have the same potential, the SW 111 and the SW 112 function as a fourth leg of the second inverter 130.

The voltage of the power supply 101 is, for example, 12 V. For example, the potentials of the nodes N1_H, N1_L, N1_1, and N1_2 in the first inverter 120 may be set to about 6 V by switching the SW 111 and the SW 112 at a duty ratio of 50%. The node potential in the first inverter 120 may be randomly set by adjusting the duty ratio, specifically, the time of an ON-time period in the switching cycle. The longer the ON-time is, the closer the node potential of the first inverter 120 is to the power supply voltage.

When an H-bridge of the U-phase is considered, the magnitude and the direction of the current flowing through the winding M1 are controlled by the magnitude relationship between the potential of the node N1_1 of the first inverter 120 and the potential of a node N2_1 of the second inverter 130. When an H-bridge of the V-phase is considered, the magnitude and direction of the current flowing through the winding M2 are controlled by the magnitude relationship between the potential of the node N1_2 of the first inverter 120 and the potential of a node N2_2 of the second inverter 130.

Figure 7:
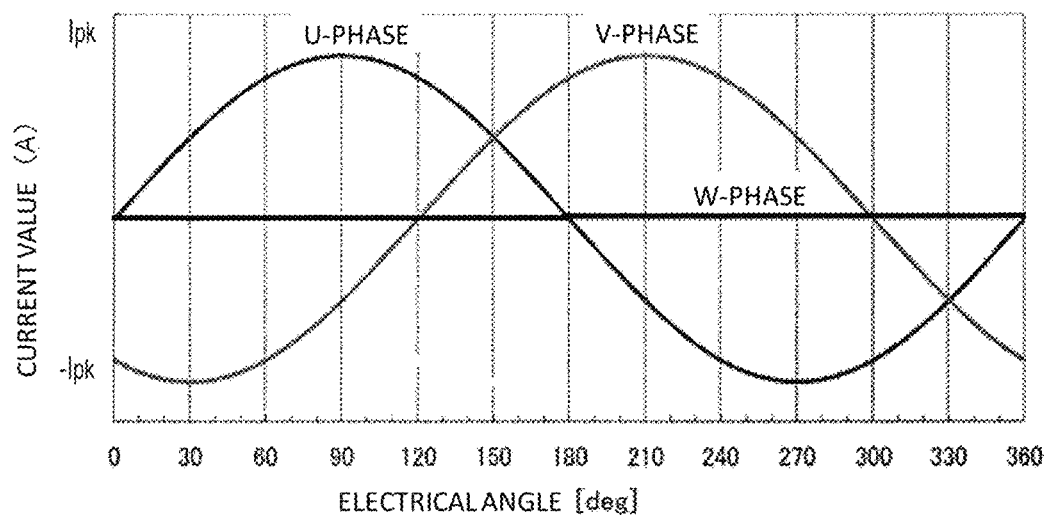
FIG. 7 is a graph illustrating an example of current waveforms obtained by plotting the value of the current flowing through each of the U-phase and V-phase windings of the motor 200 when the power converter 100 is controlled according to a two-phase energization control.

FIG. 7 illustrates an example of current waveforms obtained by plotting a value of the current flowing through each of the U-phase and V-phase windings of the motor 200 when the power converter 100 is controlled according to the two-phase energization control. A horizontal axis indicates an electrical angle (deg) of the motor, and a vertical axis indicates the value (A) of the current. In the current waveform of FIG. 7, the values of the current are plotted for every electrical angle of 30°. $I_{pk}$ represents the maximum value of the current (the value of a peak current) of each phase. The direction of the current shown in FIG. 7 follows the definition described above.

Table 2 shows the values of the currents flowing through the terminals of each inverter for each electrical angle in the current waveforms of FIG. 7. The values of the currents flowing through the U-phase and V-phase windings M1 and M2 for each electrical angle shown in Table 2 is the same as the value of the current for each electrical angle in the three-phase energization control shown in Table 1. Since the W-phase winding M3 is not energized, the value of the current flowing through the winding M3 for each electrical angle shown in Table 2 is zero.

TABLE 2

| Operation in normal state | | 0 (360) | 30 | 60 | 90 | 120 | 150 | 180 | 210 | 240 | 270 | 300 | 330 |
|---|---|---|---|---|---|---|---|---|---|---|---|---|---|
| | | | | | | Electrical angle [deg] | | | | | | | |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | OFF | OFF | OFF | OFF | OFF | OFF | OFF | OFF | OFF | OFF | OFF | OFF |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | OFF | OFF | OFF | OFF | OFF | OFF | OFF | OFF | OFF | OFF | OFF | OFF |

Figure 8:
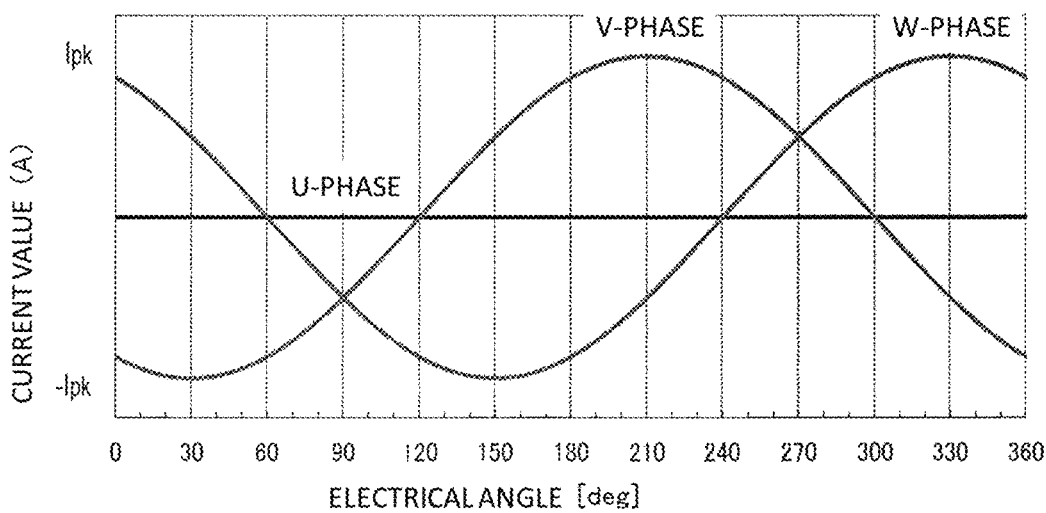
FIG. 8 is a graph illustrating an example of current waveforms obtained by plotting the value of the current flowing through each of the V-phase and W-phase windings of the motor 200 when a winding M1 is disconnected and the power converter 100 is controlled according to the two-phase energization control.
Figure 9:
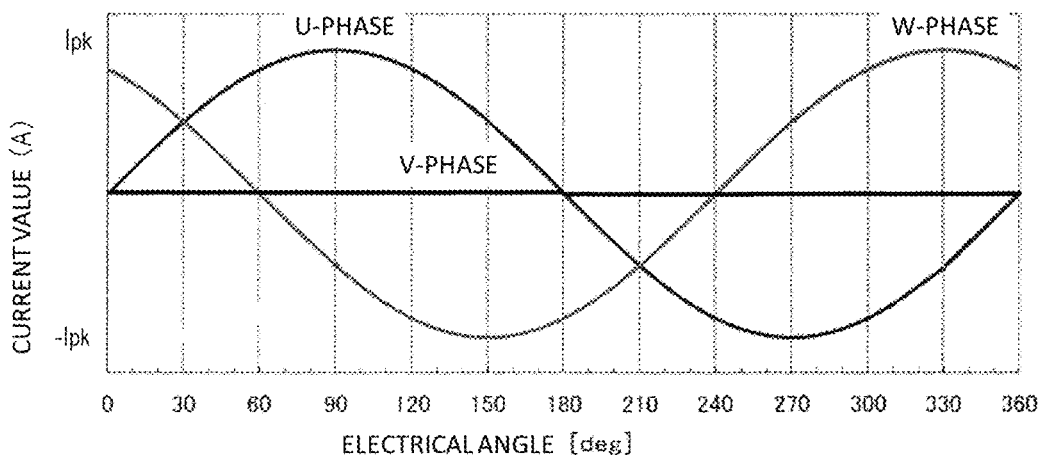
FIG. 9 is a graph illustrating an example of current waveforms obtained by plotting the value of the current flowing through each of the U-phase and W-phase windings of the motor 200 when a winding M2 is disconnected and the power converter 100 is controlled according to the two-phase energization control.

As a reverence, examples or current waveforms obtained by the two-phase energization control in a case in which the V-phase winding M2 is disconnected and current waveforms obtained by two-phase energization control in a case in which the W-phase winding M3 is disconnected are illustrated. FIG. 8 illustrates an example of current waveforms obtained by plotting the value of the current flowing through each of the V-phase and W-phase windings of the motor 200 when the winding M1 is disconnected and the power converter 100 is controlled according to the two-phase energization control. FIG. 9 illustrates an example of current waveforms obtained by plotting the value of the current flowing through each of the U-phase and W-phase windings of the motor 200 when the winding M2 is disconnected and the power converter 100 is controlled according to the two-phase energization control.

For example, the control circuit 300 controls switching operations of the SWs 131H, 131L, 132H, and 132L of the second inverter 130 by the PWM control in which the current waveforms shown in FIG. 7 are obtained while performing the switching operation on the SW 111 and the SW 112 at a 50% duty ratio. Due to the control, the windings M1 and M2 may be energized. According to the two-phase energization control of the present disclosure, although the motor torque is reduced, the motor may be continuously driven.

Hereinafter, an example of a method of controlling the motor in a case in which the first inverter 120 has failed and one of the windings M1, M2, and M3 of the motor 200 has also failed will be illustrated.

FIGS. 10A to 10E illustrate examples of the on or off state of each switching element of the first inverter 120 when the first inverter 120 has failed and the winding of the motor 200 has also failed.

Figure 10A:
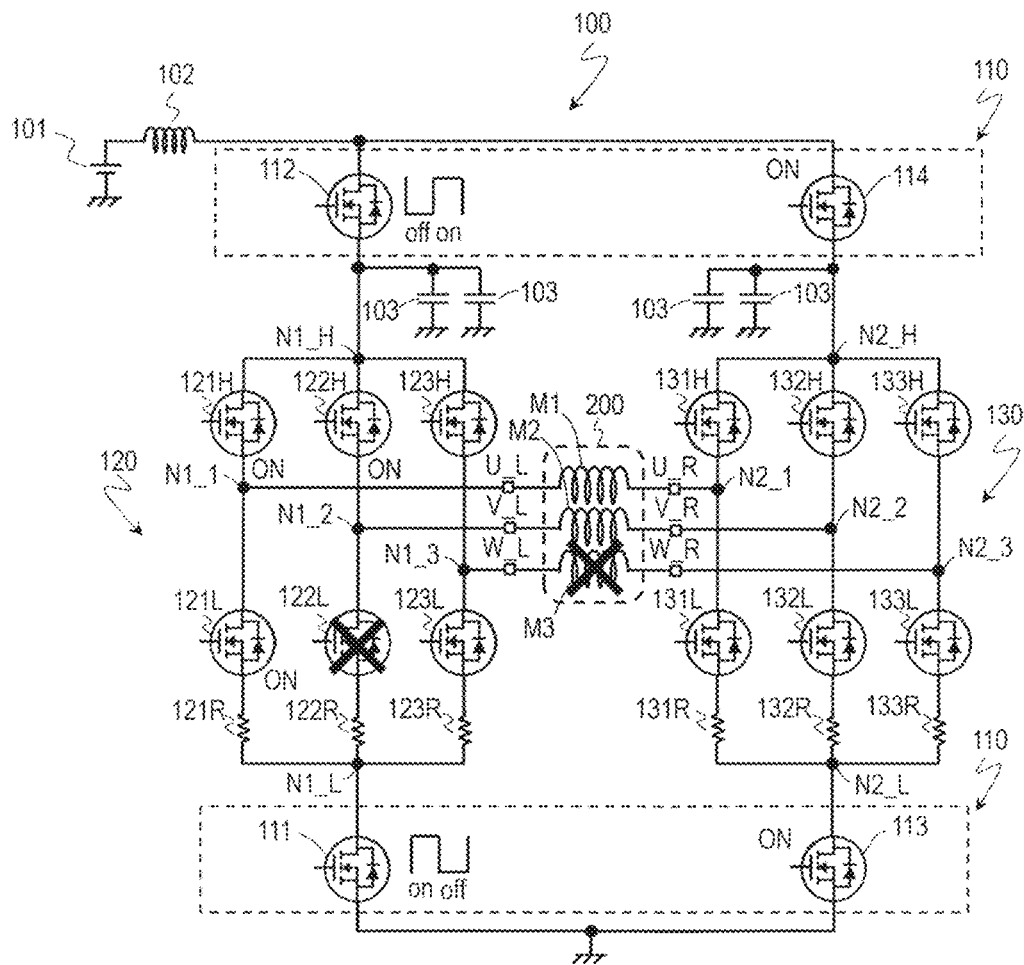
FIG. 10A is a diagram illustrating an example of the on or off state of each switching element of the first inverter 120 when the first inverter 120 has failed and the winding of the motor 200 has also failed.

It is assumed that one low-side switching element of the first inverter 120 has failed, and one phase of the three-phase windings of the motor 200 has also failed. FIG. 10A illustrates an example of the on or off state of each switching element of the first inverter 120 in a case in which the SW 122L has an open failure and the winding M3 is disconnected. As described above, the control circuit 300 determines the on or off state of each switching element such that the node potentials in the first inverter 120 are equal to each other.

The control circuit 300 turns on the SWs 121H and 121L of the U-phase leg. Accordingly, the potentials of the nodes N1_H and N1_L in the first inverter 120 are equal to each other. The control circuit 300 further turns the SW 122H on. Accordingly, the potentials of the nodes N1_1 and N1_2 in first inverter 120 are equal to each other, and as a result, all the potentials of the nodes N1_H, N1_L, N1_1, and N1_2 are equal to each other. For example, the control circuit 300 controls the switching operation of the four SWs 131H, 132H, 131L, and 132L of the U-phase and V-phase legs of the second inverter 130 while performing the switching operation on the SW 111 and the SW 112 of the switching circuit 110 at a duty ratio of 50%. Due to the control, the windings M1 and M2 may be energized.

For example, a case is considered in which the SW 122L has a short failure and the winding M3 is disconnected. In this case, since the SW 122L is always in the on state, the control circuit 300 may make the potentials of the nodes N1_H and N1_L in the first inverter 120 be equal to each other by turning on the SW 122H of the U-phase leg. As described above, the switching element having the short failure may be treated as the switching element to be turned on.

Figure 10B:
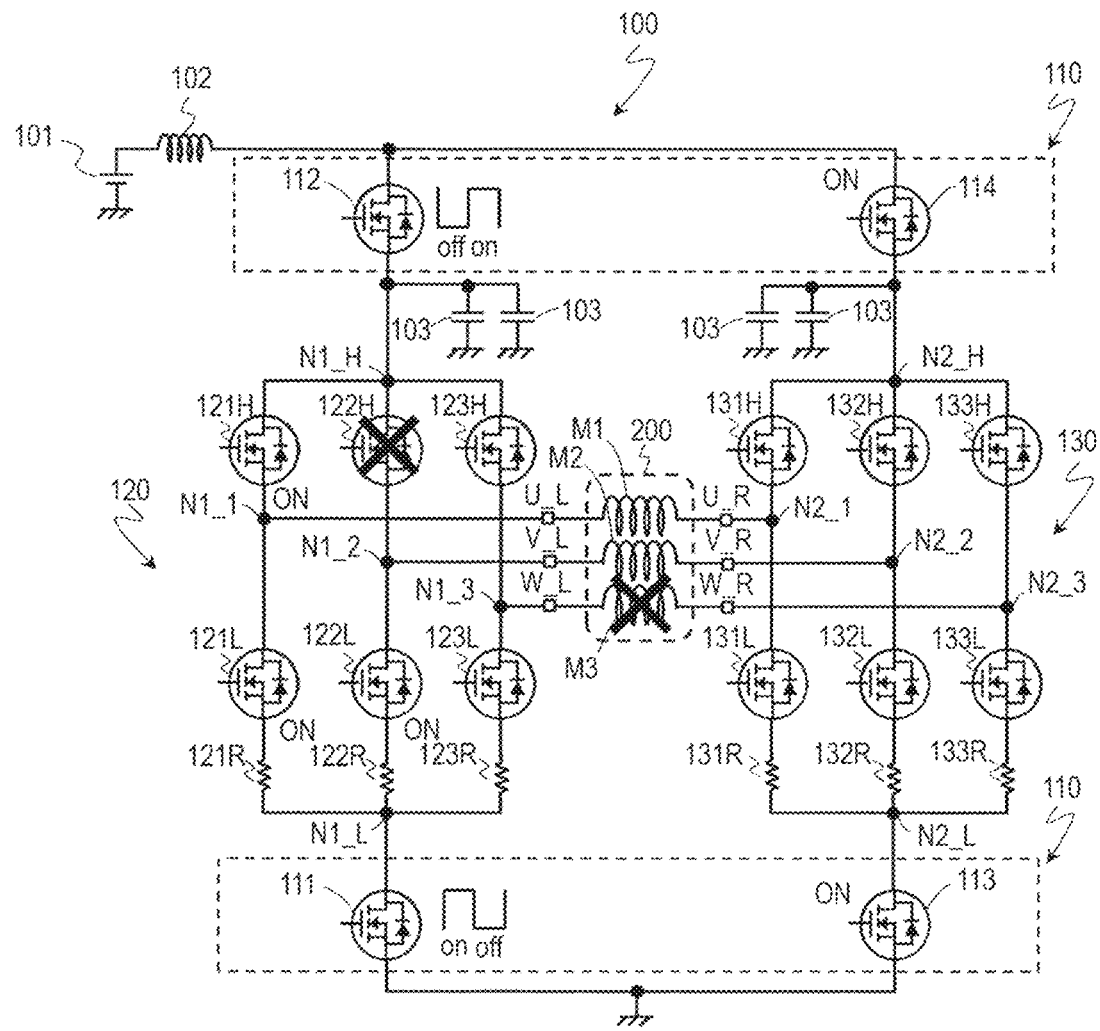
FIG. 10B is a diagram illustrating an example of the on or off state of each switching element of the first inverter 120 when the first inverter 120 has failed and the winding of the motor 200 has also failed.

It is assumed that one high-side switching element in the first inverter 120 has failed, and one phase of the three-phase windings of the motor 200 has also failed. FIG. 10B illustrates an example of the on or off state of each switching element of the first inverter 120 in a case in which the SW 122H has an open failure and the winding M3 is disconnected.

The control circuit 300 turns on the SWs 121H and 121L of the U-phase leg. The control circuit 300 further turns the SW 122L on. Accordingly, all the potentials of the nodes N1_H, N1_L, N1_1, and N1_2 are equal to each other. For example, the control circuit 300 controls the switching operation of the four SWs 131H, 132H, 131L, and 132L of the U-phase and V-phase legs of the second inverter 130 while performing the switching operation on the SW 111 and the SW 112 of the switching circuit 110 at a duty ratio of 50%.

Figure 10C:
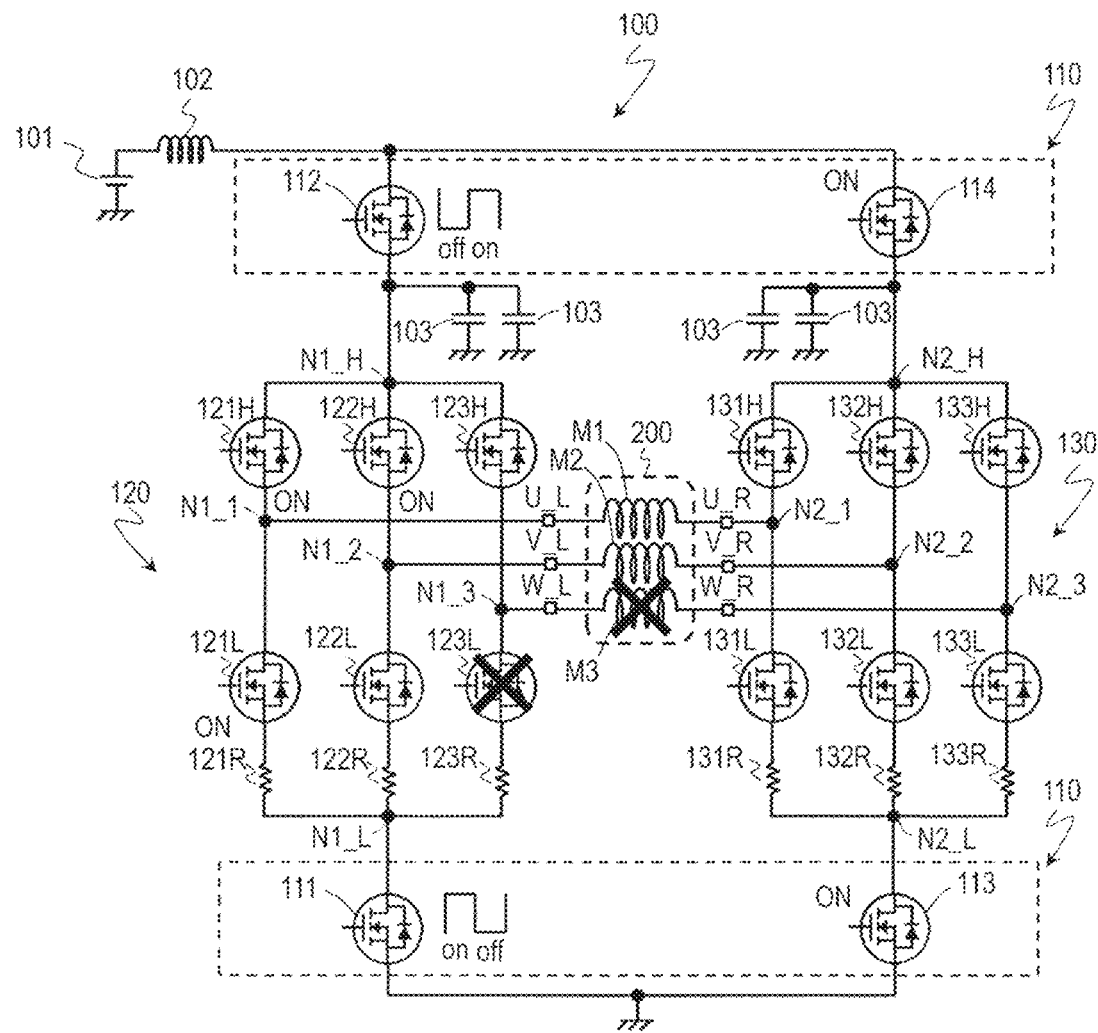
FIG. 10C is a diagram illustrating an example of the on or off state of each switching element of the first inverter 120 when the first inverter 120 has failed and the winding of the motor 200 has also failed.

It is assumed that one low-side switching element of the first inverter 120 has failed, and the winding having the same phase as that of the failed switching element has also failed. FIG. 10C illustrates an example of the on or off state of each switching element of the first inverter 120 in a case in which the SW 123L has an open failure and the winding M3 is disconnected.

In the example shown in FIG. 10C, since the SW 123L included in the H-bridge connected to the W-phase winding M3 has failed, the same control method as the two-phase energization control in the case in which the winding M3 is disconnected may be applied as a control method.

Figure 10D:
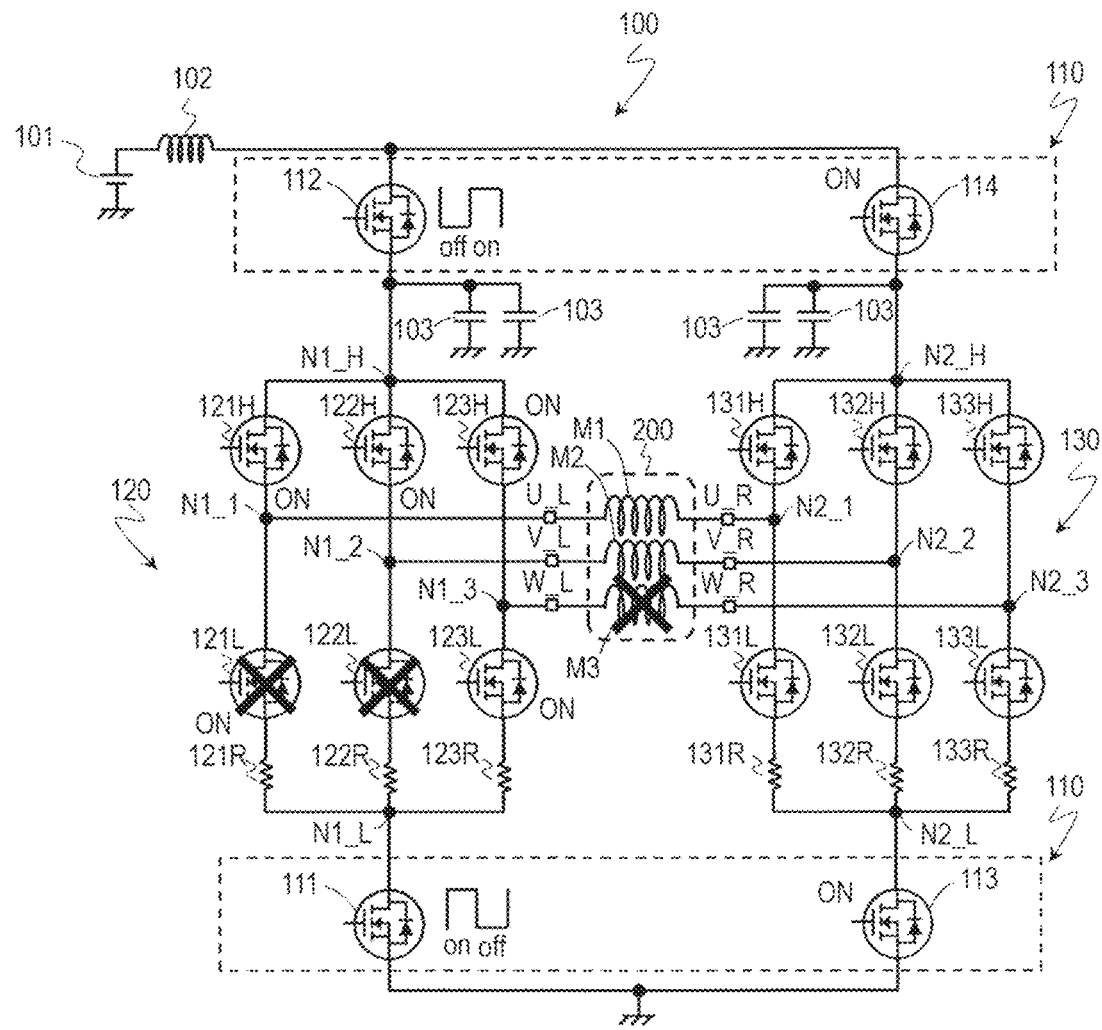
FIG. 10D is a diagram illustrating an example of the on or off state of each switching element of the first inverter 120 when the first inverter 120 has failed and the winding of the motor 200 has also failed.

It is assumed that two low-side switching elements of the first inverter 120 have failed, and one phase of the three-phase windings of the motor 200 has also failed. FIG. 10D illustrates an example of the on or off state of each switching element in the first inverter 120 in a case in which the SWs 121L and 122L have an open failure and the winding M3 is disconnected.

The control circuit 300 turns on the SWs 123H and 123L of the W-phase leg. The control circuit 300 further turns on the SWs 121H and 122H. Accordingly, all the potentials of the nodes N1_H, N1_L, N1_1, and N1_2 are equal to each other.

Figure 10E:
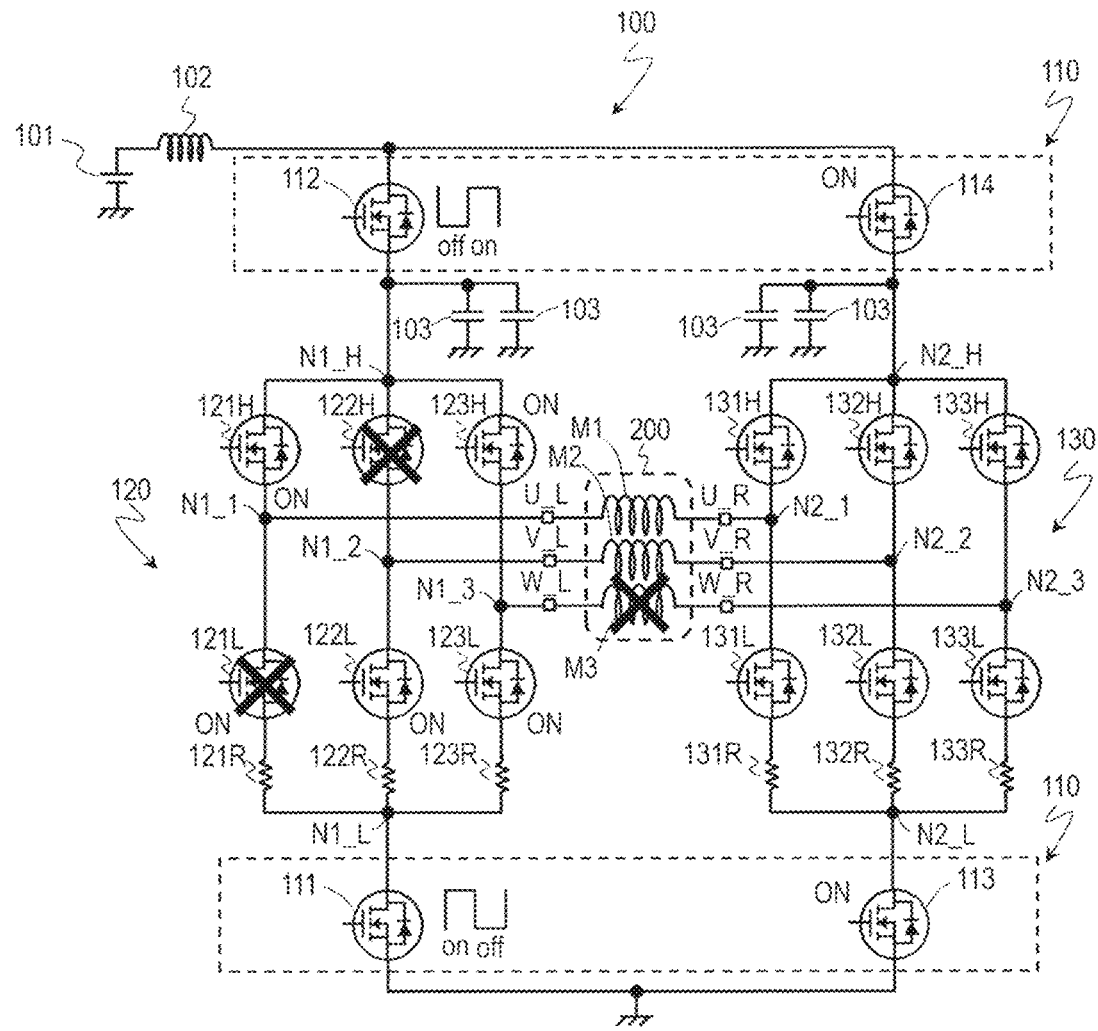
FIG. 10E is a diagram illustrating an example of the on or off state of each switching element of the first inverter 120 when the first inverter 120 has failed and the winding of the motor 200 has also failed.

It is assumed that one low-side switching element and one high-side switching element in the first inverter 120 have failed, and one of the three-phase windings of the motor 200 has failed. FIG. 10E illustrates an example of the on or off state of each switching element in the first inverter 120 in a case in which the SWs 121L and 122H of the first inverter 120 have an open failure and the winding M3 is disconnected.

The control circuit 300 turns on the SWs 123H and 123L of the W-phase leg. The control circuit 300 further turns on, for example, the SWs 121H and 122L. Accordingly, all the potentials of the nodes N1_H, N1_L, N1_1, and N1_2 are equal to each other.

According to the present example embodiment, the two-phase energization control may be performed when one phase of the three-phase windings has failed, thereby continuously driving the motor. Further, the two-phase energization control may be performed even when the switching element in one of the first and second inverters 120 and 130 has failed, thereby continuously driving the motor.

Figure 11:
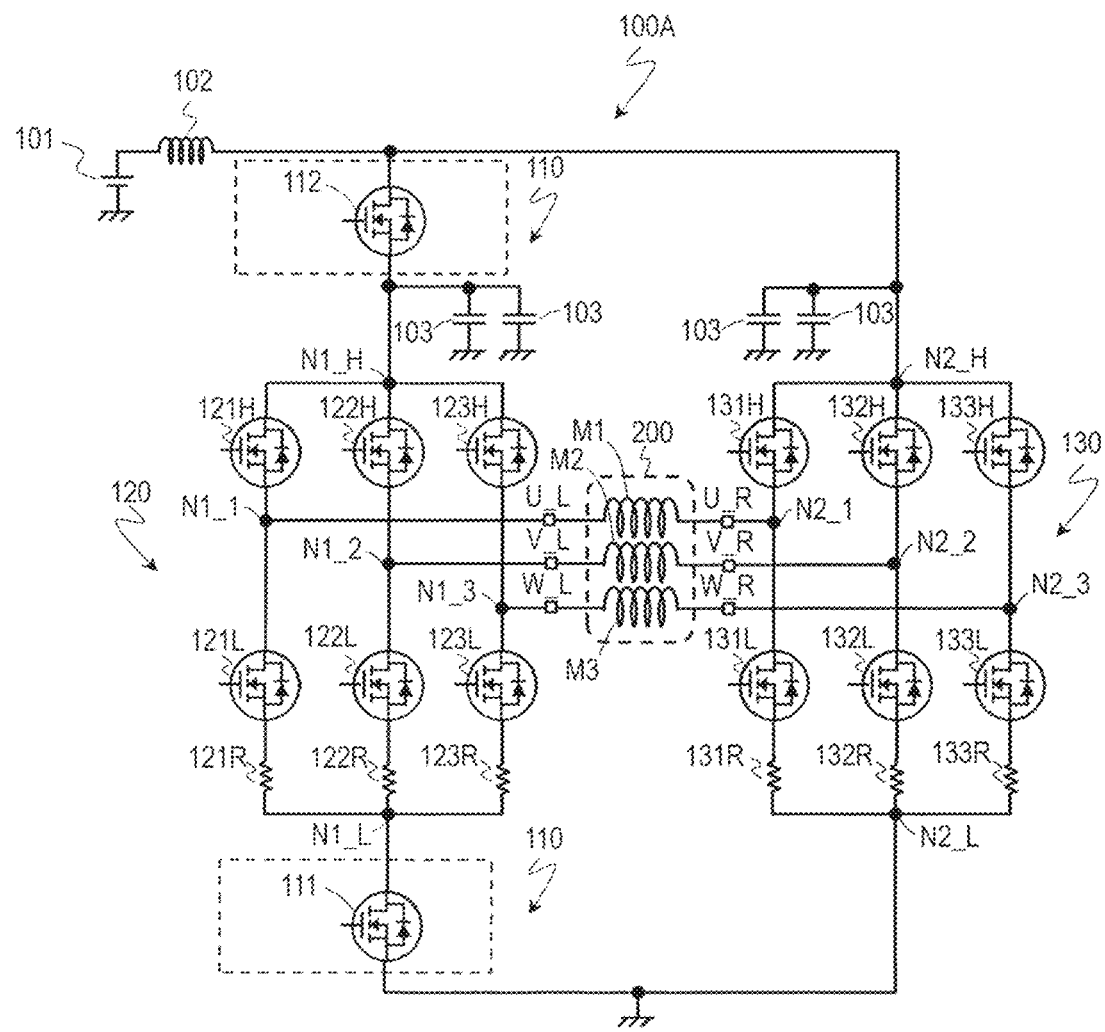
FIG. 11 is a circuit diagram schematically illustrating a circuit configuration of a power converter 100A according to a modified example of the first example embodiment of the present disclosure.

FIG. 11 schematically illustrates a circuit configuration of a power converter 100A according to a modified example of the present example embodiment.

The power converter 100A includes a switching circuit 110 having first and second switching elements 111 and 112. A second inverter 130 bypasses the switching circuit 110 and is connected to a power supply 101 and a GND. According to the modified example, for example, when the first inverter 120 has failed, that is, when the inverter to which the switching circuit 110 is connected has failed, a motor may be continuously driven by performing a two-phase energization control according to the above-described control method.

According to a power converter of the present disclosure, two-phase windings may be energized using two-phase windings and two legs of an inverter connected to the two-phase windings. In other words, when the inverter is provided with two legs for two phases, a two-phase energization control may be performed even in a normal control.

Figure 12:
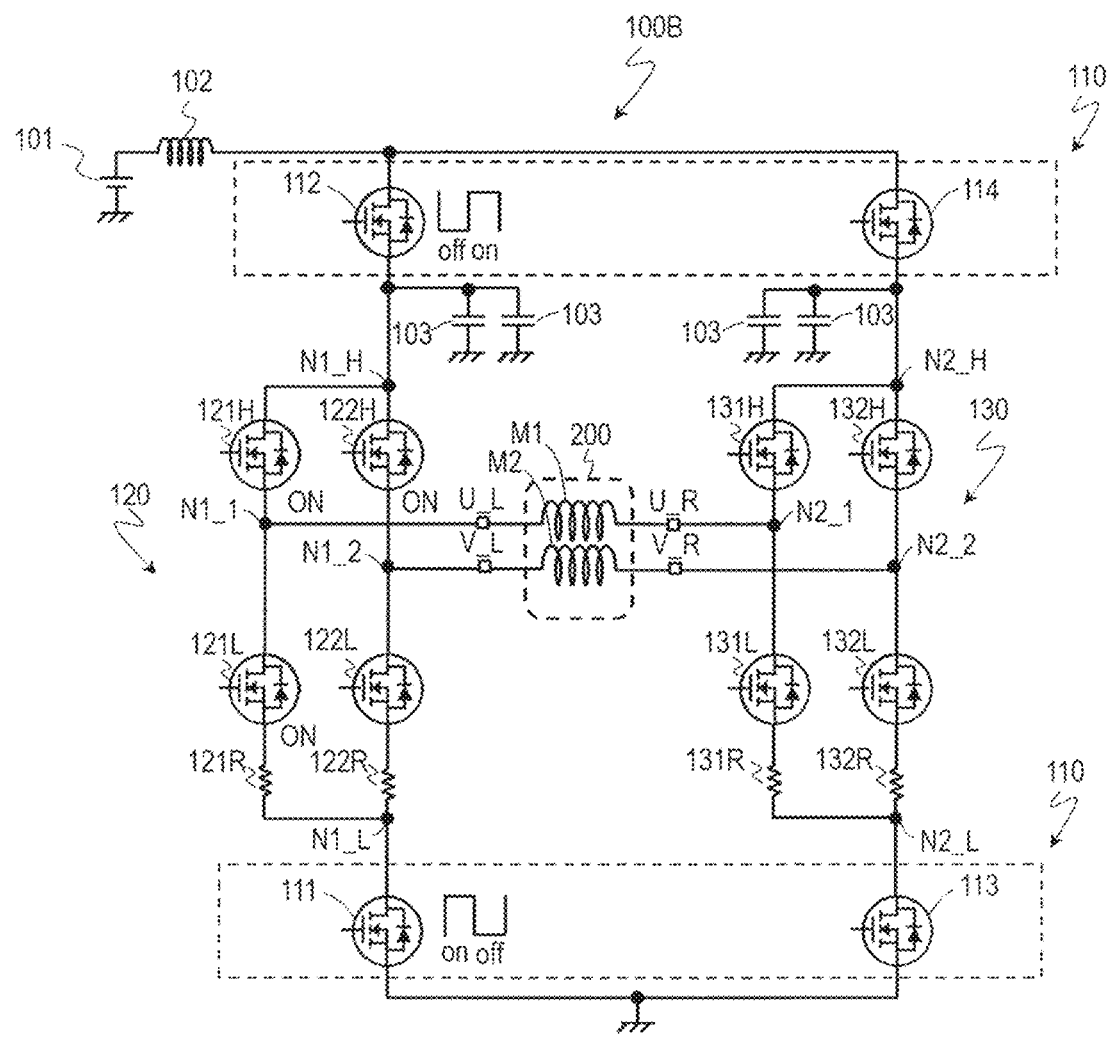
FIG. 12 is a circuit diagram schematically illustrating a circuit configuration of a power converter 100B according to a second example embodiment of the present disclosure.

FIG. 12 schematically illustrates a circuit configuration of a power converter 100B according to the present example embodiment.

The power converter 100B includes a switching circuit 110, a first inverter 120, and a second inverter 130. The power converter 100B differs from the power converter 100 according to the first example embodiment in that each of the first inverter 120 and the second inverter 130 includes two legs for a U-phase and a V-phase. Hereinafter, differences from the power converter 100 will be mainly described.

The first inverter 120 includes a U-phase leg having SWs 121H and 121L and a V-phase leg having SWs 122H and 122L. The second inverter 130 includes a U-phase leg having SWs 131H and 131L and a V-phase leg having SWs 132H and 132L. The power converter 100B is connected to, for example, a two-phase AC motor and may perform the two-phase energization control described in the first example embodiment for control in normal and abnormal states.

For example, in the normal control, a control circuit 300 of the power converter 100B turns on the SWs 121H and 121L of the U-phase leg of the first inverter 120 and turns on at least one of the SWs 122H and 122L of the V-phase leg. Accordingly, in the first inverter 120, potentials of nodes N1_H and N1_L are equal to each other, and potentials of nodes N1_1 and N1_2 are equal to each other. For example, the control circuit 300 may energize windings M1 and M2 using two legs of the second inverter 130 while performing switching operations for an SW 111 and an SW 112 of the switching circuit at a duty ratio of 50%.

For example, it is assumed that the SW 121L of the first inverter 120 has failed. In that case, the control circuit 300 turns on the SWs 122H and 122L of the V-phase leg of the first inverter 120 and turns on the SW 121H of the U-phase leg. Accordingly, in the first inverter 120, the potentials of the nodes N1_H and N1_L are equal to each other, and the potentials of the nodes N1_1 and N1_2 are equal to each other.

Figure 13:
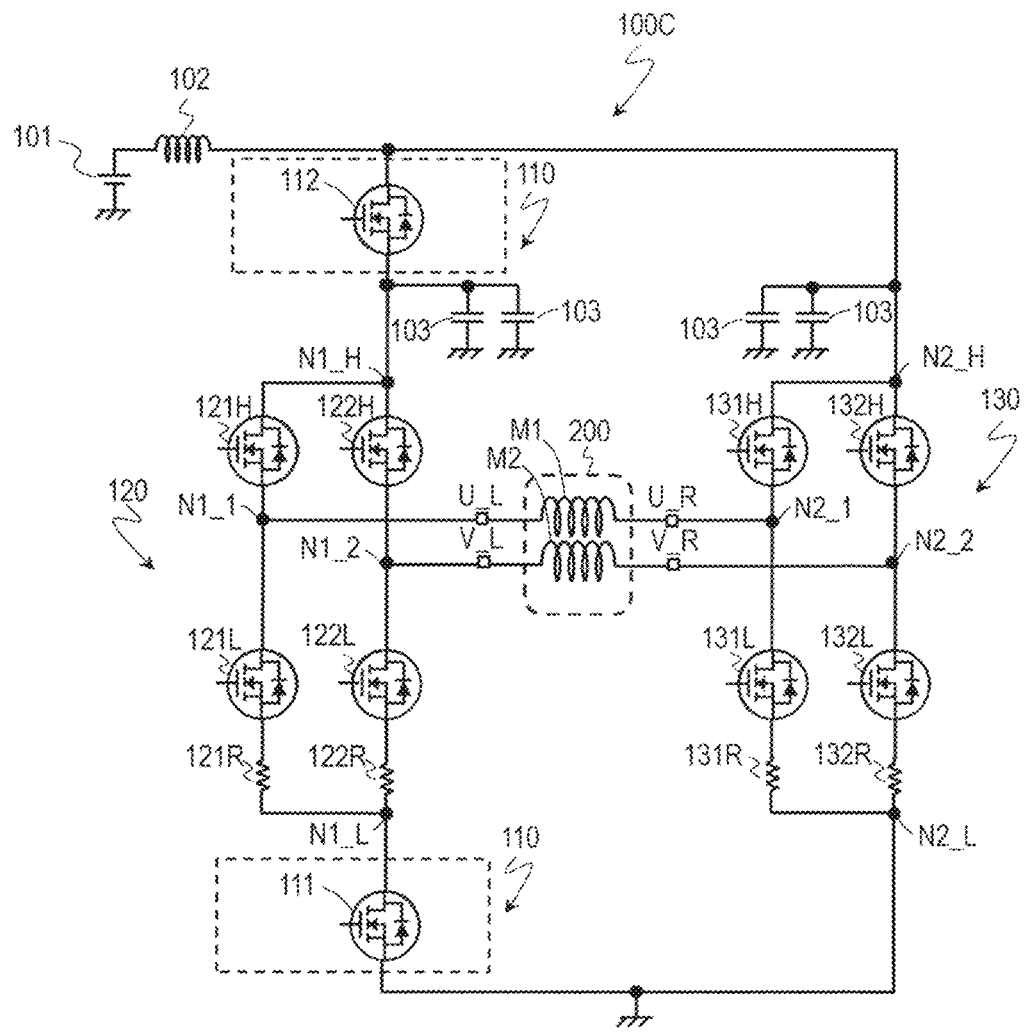
FIG. 13 is a circuit diagram schematically illustrating a circuit configuration of a power converter 100C according to a modified example of the second example embodiment of the present disclosure.

FIG. 13 schematically illustrates a circuit configuration of a power converter 100C according to a modified example of the present example embodiment.

Like the circuit configuration shown in FIG. 11, a switching circuit 110 may include first and second switching elements 111 and 112 and may not include third and fourth switching elements 113 and 114.

Figure 14:
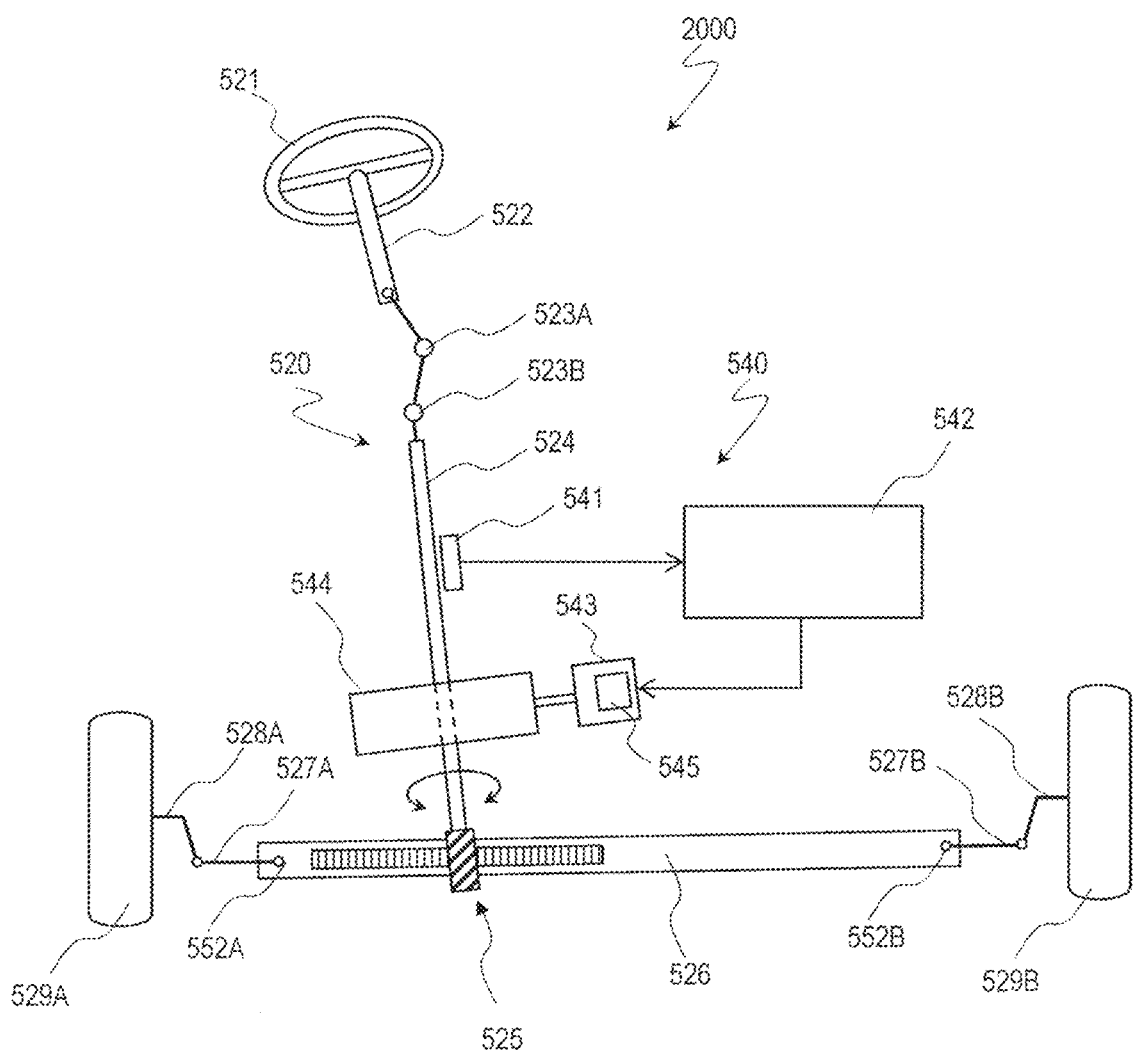
FIG. 14 is a schematic diagram illustrating a typical configuration of an electric power steering device 2000 according to a third example embodiment of the present disclosure.

FIG. 14 schematically illustrates a typical configuration of an electric power steering device 2000 according to the present example embodiment.

Vehicles such as automobiles generally include an electric power steering (EPS) device. The electric power steering device 2000 according to the present example embodiment includes a steering system 520 and an auxiliary torque mechanism 540 generating an auxiliary torque. The electric power steering device 2000 generates the auxiliary torque that assists the steering torque of the steering system generated by a driver's operation of a steering wheel. The strain on the driver's operation is reduced by the auxiliary torque.

The steering system 520 includes, for example, a steering wheel 521, a steering shaft 522, universal joint couplings 523A and 523B, a rotating shaft 524, a rack and pinion mechanism 525, a rack shaft 526, left and right ball joints 552A and 552B, tie rods 527A and 527B, knuckles 528A and 528B, and left and right steering wheels 529A and 529B.

The auxiliary torque mechanism 540 includes, for example, a steering torque sensor 541, an electronic control unit (ECU) 542 for an automobile, a motor 543, and a reduction mechanism 544. The steering torque sensor 541 detects a steering torque in the steering system 520. The ECU 542 generates a driving signal on the basis of the detected signal by the steering torque sensor 541. The motor 543 generates an auxiliary torque according to the steering torque on the basis of the driving signal. The motor 543 transfers the generated auxiliary torque to the steering system 520 through the reduction mechanism 544.

The ECU 542 includes, for example, the microcontroller 340 and the driving circuit 350 according to the first example embodiment. In automobiles, an electronic control system is built using an ECU as a core. In the electric power steering device 2000, a motor driving unit is built, for example, of the ECU 542, the motor 543, and an inverter 545. The motor driving unit 400 according to the first example embodiment may be suitably used for the unit.

The example embodiments of the present disclosure may be widely used in a variety of devices equipped with various motors, such as cleaners, dryers, ceiling fans, washing machines, refrigerators, and electric power steering devices.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power converter to convert power from a power supply into power supplied to a motor with n-phase windings where n is an integer of 2 or more, the power converter comprising:
   a first inverter connected to a first end of each of the n-phase windings of the motor and including n legs each including a low-side switching element and a high-side switching element;
   a second inverter connected to a second end of each of the n-phase windings and including n legs each including a low-side switching element and a high-side switching element; and
   a switching circuit including a first switching element to switch connection and disconnection between the first inverter and a ground and a second switching element to switch connection and disconnection between the first inverter and the power supply, the first switching element and the second switching element being structured to cut off a bidirectional current; wherein
   in a state in which, in the first inverter, potentials at a first node in a high side, to which the n legs are connected, and a second node in a low side, to which the n legs are connected, are equal to each other, and potentials at first ends of two-phase windings of the n-phase windings are equal to each other, the two-phase windings are energized using two legs connected to the second ends of the two-phase windings of the n legs of the second inverter while performing switching operations on the first and second switching elements of the switching circuit at a predetermined duty ratio.

2. The power converter of claim 1, wherein the switching circuit further includes a third switching element to switch connection and disconnection between the second inverter and the ground, and a fourth switching element to switch connection and disconnection between the second inverter and the power supply.

3. The power converter of claim 1, wherein n is an integer of 3 or more, and when an n−2-phase winding of the n-phase windings has failed, in a state in which, in the first inverter, potentials at the first node in the high side and the second node in the low side are equal to each other, and potentials at first ends of non-failed two-phase windings of the n-phase windings are equal to each other, the two-phase windings are energized using two legs connected to the second ends of the two-phase windings of the n legs of the second inverter while performing switching operations on the first and second switching elements at the predetermined duty ratio.

4. The power converter of claim 1, wherein when an n−2-phase winding of the n-phase windings has failed and the first inverter includes a failed switching element, in a state in which, in the first inverter, potentials at the first node in the high side and the second node in the low side are equal to each other, and potentials at first ends of non-failed two-phase windings of the n-phase windings are equal to each other, the two-phase windings are energized using two legs connected to the second ends of the two-phase windings of the n legs of the second inverter while performing switching operations on the first and second switching elements at the predetermined duty ratio.

5. The power converter of claim 3, wherein, when the non-failed two-phase windings are energized, in the first inverter, both the low-side switching element and the high-side switching element included in at least one of the n legs are in an on state.

6. The power converter of claim 5, wherein the high-side switching element included in one of the two legs connected to the first ends of the non-failed two-phase windings is in an on state, and at least one of the high-side switching element and the low-side switching element included in the other one of the two legs is in an on state.

7. The power converter of claim 5, wherein the low-side switching element included in one of the two legs connected to the first ends of the non-failed two-phase windings is in an on state, and at least one of the high-side switching element and the low-side switching element included in the other one of the two legs is in an on state.

8. The power converter of claim 1, wherein a duty ratio is 50%.

9. The power converter of claim 1, wherein the power supply includes a first power supply for the first inverter and a second power supply for the second inverter.

10. A motor driving unit comprising:
the motor;
the power converter of claim 1; and
a control circuit to control the power converter.

11. An electric power steering device comprising:
an auxiliary torque mechanism; and
the motor driving unit of claim 10.

* * * * *